US011438282B2

(12) United States Patent
Cotner et al.

(10) Patent No.: US 11,438,282 B2
(45) Date of Patent: Sep. 6, 2022

(54) SYNCHRONICITY OF ELECTRONIC MESSAGES VIA A TRANSFERRED SECURE MESSAGING CHANNEL AMONG A SYSTEM OF VARIOUS NETWORKED COMPUTING DEVICES

(71) Applicant: Khoros, LLC, Austin, TX (US)

(72) Inventors: Adam Cotner, Austin, TX (US); Justin Fellers, Austin, TX (US)

(73) Assignee: Khoros, LLC, Austin, TX (US)

( * ) Notice: Subject to any disclaimer, the term of this patent is extended or adjusted under 35 U.S.C. 154(b) by 0 days.

(21) Appl. No.: 17/092,167

(22) Filed: Nov. 6, 2020

(65) Prior Publication Data

US 2022/0150188 A1    May 12, 2022

(51) Int. Cl.
*H04L 51/02*    (2022.01)
*H04L 9/40*    (2022.01)

(52) U.S. Cl.
CPC .............. *H04L 51/02* (2013.01); *H04L 63/04* (2013.01)

(58) Field of Classification Search
CPC ................................ H04L 51/02; H04L 63/04
USPC .......................................................... 709/206
See application file for complete search history.

(56) References Cited

U.S. PATENT DOCUMENTS

| 6,041,311 | A | 3/2000 | Chislenko et al. |
| 6,146,026 | A | 11/2000 | Ushiku |
| 6,385,611 | B1 | 5/2002 | Cardona |
| 6,684,239 | B1 | 1/2004 | Flepp et al. |
| 6,742,032 | B1 | 5/2004 | Castellani et al. |
| 6,871,232 | B2 | 3/2005 | Curie et al. |

(Continued)

FOREIGN PATENT DOCUMENTS

| CN | 102054033 A | 5/2011 |
| CN | 103177095 B | 12/2015 |

(Continued)

OTHER PUBLICATIONS

Antoniades et al., "we.b: The web of short URLs," Apr. 2011, Proceedings of the 20th International Conference on World Wide Web, Mar. 28-Apr. 1, 2011, Hyderabad, India, pp. 715-724 (Year: 2011).

(Continued)

*Primary Examiner* — Frantz B Jean
(74) *Attorney, Agent, or Firm* — Kokka & Backus, PC

(57) ABSTRACT

Various embodiments relate generally to data science and data analysis, computer software and systems, and control systems to provide a platform to facilitate implementation of an interface, among other things, and, more specifically, to a computing and data platform that implements logic to facilitate transfer of an exchange of electronic messages to a secure messaging channel having configurable states of synchronicity based on one or more message-related attributes. In some examples, a method may include detecting an electronic message via a first data channel, transmitting an invitation message to transfer an exchange of electronic messages to a secure data channel, establishing a secure data channel, identifying an attribute to initiate routing of an electronic message to generate an automatic response or data representing an agent-assisted response, or both, transmitting an electronic response message as a function of availability of a first data channel, and the like.

20 Claims, 13 Drawing Sheets

(56) References Cited

U.S. PATENT DOCUMENTS

| | | |
|---|---|---|
| 7,031,952 B1 | 4/2006 | Heumann et al. |
| 7,032,030 B1 | 4/2006 | Codignotto |
| 7,222,156 B2 | 5/2007 | Gupta et al. |
| 7,409,710 B1 | 8/2008 | Uchil et al. |
| 7,590,636 B1 | 9/2009 | Heumann et al. |
| 7,606,865 B2 | 10/2009 | Kumar et al. |
| 7,644,057 B2 | 1/2010 | Nelken et al. |
| 7,702,541 B2 | 4/2010 | Black et al. |
| 7,725,492 B2 | 5/2010 | Sittig et al. |
| 7,751,620 B1 | 7/2010 | Cosoi |
| 7,756,926 B2 | 7/2010 | Tseng et al. |
| 7,792,948 B2 | 9/2010 | Zhao et al. |
| 7,818,758 B2 | 10/2010 | Bonet et al. |
| 7,831,912 B2 | 11/2010 | King et al. |
| 7,853,565 B1 | 12/2010 | Liskov |
| 7,979,369 B2 | 7/2011 | Grenier et al. |
| 8,006,187 B1 | 8/2011 | Bailey et al. |
| 8,027,931 B2 | 9/2011 | Kalaboukis |
| 8,082,308 B1 | 12/2011 | Filev |
| 8,131,745 B1 | 3/2012 | Hoffman et al. |
| 8,171,128 B2 | 5/2012 | Zuckerberg et al. |
| 8,200,527 B1 | 6/2012 | Thompson et al. |
| 8,225,376 B2 | 7/2012 | Zuckerberg et al. |
| 8,286,154 B2 | 10/2012 | Kaakani et al. |
| 8,321,300 B1 | 11/2012 | Bockius et al. |
| 8,412,657 B2 | 4/2013 | Grenier et al. |
| 8,437,369 B2 | 5/2013 | Shaikli |
| 8,505,069 B1 | 8/2013 | Solodovnikov et al. |
| 8,606,792 B1 | 12/2013 | Jackson et al. |
| 8,615,442 B1 | 12/2013 | Kapur et al. |
| 8,744,937 B2 | 6/2014 | Seubert et al. |
| 8,752,041 B2 | 6/2014 | Akiyoshi et al. |
| 8,769,417 B1 | 7/2014 | Robinson et al. |
| 8,813,125 B2 | 8/2014 | Reisman |
| 8,825,515 B1 | 9/2014 | Hanson |
| 8,886,580 B2 | 11/2014 | Grenier et al. |
| 8,892,524 B1 | 11/2014 | Lee et al. |
| 8,943,069 B2 | 1/2015 | Neumann et al. |
| 8,972,428 B2 | 3/2015 | Dicker et al. |
| 9,021,361 B1 | 4/2015 | Pettinati et al. |
| 9,105,044 B2 | 8/2015 | Wu |
| 9,131,382 B1 | 9/2015 | Johns |
| 9,141,997 B2 | 9/2015 | Gaedcke et al. |
| 9,143,478 B2 | 9/2015 | Ramaswamy |
| 9,229,702 B1 | 1/2016 | Kapulkin et al. |
| 9,251,360 B2 | 2/2016 | Meyer et al. |
| 9,282,098 B1 | 3/2016 | Hitchcock et al. |
| 9,286,102 B1 | 3/2016 | Harel et al. |
| 9,311,683 B1 | 4/2016 | Saylor et al. |
| 9,325,696 B1 | 4/2016 | Balfanz et al. |
| 9,338,186 B2 | 5/2016 | Wollenstein et al. |
| 9,369,454 B2 | 6/2016 | Porzio et al. |
| 9,378,295 B1 | 6/2016 | Marra et al. |
| 9,483,802 B2 | 11/2016 | Gaedcke et al. |
| 9,501,746 B2 | 11/2016 | Prakash |
| 9,509,742 B2 | 11/2016 | Gordon |
| 9,514,459 B1 | 12/2016 | Doshi et al. |
| 9,519,723 B2 | 12/2016 | Lorenz et al. |
| 9,596,206 B2 | 3/2017 | Bueno et al. |
| 9,619,531 B2 | 4/2017 | Wu |
| 9,654,450 B2 | 5/2017 | Ford et al. |
| 9,756,098 B2 | 9/2017 | Kazerani et al. |
| 9,787,664 B1 | 10/2017 | Subbiah et al. |
| 9,800,639 B2 | 10/2017 | Gordon |
| 9,953,063 B2 | 4/2018 | Spasojevic et al. |
| 10,084,838 B2 | 9/2018 | Gordon et al. |
| 10,142,386 B2 | 11/2018 | Gordon |
| 10,178,173 B2 | 1/2019 | Kadowaki et al. |
| 10,180,971 B2 | 1/2019 | Bhave et al. |
| 10,188,905 B2 | 1/2019 | Dohlen |
| 10,204,344 B2 | 2/2019 | Gaedcke et al. |
| 10,204,383 B2 | 2/2019 | Gaedcke et al. |
| 10,264,042 B2 | 4/2019 | Gordon |
| 10,264,073 B2 | 4/2019 | Kadowaki et al. |
| 10,284,723 B1 * | 5/2019 | Neuer, III ........... H04M 3/5183 |
| 10,346,449 B2 | 7/2019 | Senftleber et al. |
| 10,417,180 B1 | 9/2019 | Patwardhan |
| 10,430,894 B2 | 10/2019 | Wu |
| 10,489,866 B2 | 11/2019 | Gaedcke et al. |
| 10,491,490 B2 | 11/2019 | Sridhar et al. |
| 10,497,069 B2 | 12/2019 | Gaedcke et al. |
| 10,594,773 B2 | 3/2020 | Falcao et al. |
| 10,601,937 B2 | 3/2020 | Holzband et al. |
| 10,785,222 B2 | 9/2020 | Senftleber et al. |
| 10,855,657 B2 | 12/2020 | Senftleber et al. |
| 10,867,131 B2 | 12/2020 | Scott et al. |
| 10,902,462 B2 | 1/2021 | Savage et al. |
| 10,931,540 B2 | 2/2021 | Davis et al. |
| 10,956,459 B2 | 3/2021 | Senftleber et al. |
| 10,999,278 B2 | 5/2021 | Senftleber et al. |
| 11,050,704 B2 | 6/2021 | Senftleber et al. |
| 11,061,900 B2 | 7/2021 | Falcao et al. |
| 11,087,261 B1 | 8/2021 | Basu et al. |
| 2001/0025253 A1 | 9/2001 | Heintz et al. |
| 2001/0037469 A1 | 11/2001 | Gupta et al. |
| 2001/0042087 A1 | 11/2001 | Kephart et al. |
| 2001/0047290 A1 | 11/2001 | Petras et al. |
| 2002/0010746 A1 | 1/2002 | Jilk et al. |
| 2002/0049793 A1 | 4/2002 | Okumura et al. |
| 2002/0070953 A1 | 6/2002 | Barg et al. |
| 2002/0105545 A1 | 8/2002 | Carter et al. |
| 2002/0144156 A1 | 10/2002 | Copeland |
| 2003/0005103 A1 | 1/2003 | Narad et al. |
| 2003/0028525 A1 | 2/2003 | Santos et al. |
| 2003/0078959 A1 | 4/2003 | Yeung et al. |
| 2003/0128203 A1 | 7/2003 | Marshall et al. |
| 2003/0135565 A1 | 7/2003 | Estrada |
| 2003/0187871 A1 | 10/2003 | Amano et al. |
| 2003/0225850 A1 | 12/2003 | Teague |
| 2004/0049673 A1 | 3/2004 | Song et al. |
| 2004/0073666 A1 | 4/2004 | Foster et al. |
| 2004/0133697 A1 | 7/2004 | Mamaghani et al. |
| 2004/0174397 A1 | 9/2004 | Cereghini et al. |
| 2005/0060643 A1 | 3/2005 | Glass et al. |
| 2005/0074126 A1 | 4/2005 | Stanko |
| 2005/0132348 A1 | 6/2005 | Meulemans et al. |
| 2005/0206644 A1 | 9/2005 | Kincaid |
| 2005/0283614 A1 | 12/2005 | Hardt |
| 2006/0010215 A1 | 1/2006 | Clegg et al. |
| 2006/0036685 A1 | 2/2006 | Canning et al. |
| 2006/0129602 A1 | 6/2006 | Witriol et al. |
| 2006/0143307 A1 | 6/2006 | Codignotto |
| 2006/0155581 A1 | 7/2006 | Eisenberger et al. |
| 2006/0185021 A1 | 8/2006 | Dujari et al. |
| 2006/0206578 A1 | 9/2006 | Heidloff et al. |
| 2006/0294196 A1 | 12/2006 | Feirouz et al. |
| 2007/0083536 A1 | 4/2007 | Darnell et al. |
| 2007/0118889 A1 | 5/2007 | Fredell |
| 2007/0136354 A1 | 6/2007 | Chen |
| 2007/0171716 A1 | 7/2007 | Wright et al. |
| 2007/0220029 A1 | 9/2007 | Jones et al. |
| 2007/0226177 A1 | 9/2007 | Barsness et al. |
| 2007/0240119 A1 | 10/2007 | Ducheneaut et al. |
| 2007/0282800 A1 | 12/2007 | England et al. |
| 2007/0286528 A1 | 12/2007 | Podilchuk |
| 2007/0289006 A1 | 12/2007 | Ramachandran et al. |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0201344 A1 | 8/2008 | Levergood et al. |
| 2008/0215591 A1 | 9/2008 | Howard et al. |
| 2008/0221870 A1 | 9/2008 | Attardi et al. |
| 2008/0225848 A1 | 9/2008 | Pilon et al. |
| 2008/0263603 A1 | 10/2008 | Murray et al. |
| 2008/0294680 A1 | 11/2008 | Powell et al. |

(56) References Cited

U.S. PATENT DOCUMENTS

| | | |
|---|---|---|
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Ayloo |
| 2009/0300036 A1 | 12/2009 | Nagasaki |
| 2010/0071052 A1 | 3/2010 | Mao et al. |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0174813 A1 | 7/2010 | Hildreth et al. |
| 2010/0205663 A1 | 8/2010 | Ward et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0257117 A1 | 10/2010 | Shvadron et al. |
| 2010/0262661 A1* | 10/2010 | McColgan ............ H04L 51/043 709/204 |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0293560 A1 | 11/2010 | Bland et al. |
| 2010/0306122 A1 | 12/2010 | Shaffer |
| 2010/0306528 A1 | 12/2010 | Andress et al. |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0055309 A1* | 3/2011 | Gibor ............ H04L 69/18 709/227 |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2011/0302653 A1 | 12/2011 | Frantz et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1* | 4/2012 | Feng ............ G06F 16/23 705/347 |
| 2012/0102021 A1 | 4/2012 | Hill et al. |
| 2012/0117059 A1 | 5/2012 | Bailey et al. |
| 2012/0131653 A1 | 5/2012 | Pasquero et al. |
| 2012/0150759 A1 | 6/2012 | Tarjan |
| 2012/0158632 A1 | 6/2012 | Grenier et al. |
| 2012/0195422 A1 | 8/2012 | Famous |
| 2012/0198197 A1 | 8/2012 | Gladwin et al. |
| 2012/0208568 A1 | 8/2012 | Cooley |
| 2012/0210119 A1 | 8/2012 | Baxter et al. |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0317198 A1 | 12/2012 | Patton et al. |
| 2013/0006403 A1 | 1/2013 | Moore et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0126042 A1 | 5/2013 | Dewald et al. |
| 2013/0138428 A1 | 5/2013 | Chandramouli et al. |
| 2013/0138742 A1 | 5/2013 | Dziubinski |
| 2013/0159472 A1 | 6/2013 | Newton et al. |
| 2013/0198260 A1 | 8/2013 | Dow et al. |
| 2013/0198296 A1* | 8/2013 | Roy .................... G06Q 10/107 709/206 |
| 2013/0212349 A1 | 8/2013 | Maruyama |
| 2013/0218801 A1 | 8/2013 | Rago |
| 2013/0218865 A1 | 8/2013 | Angulo et al. |
| 2013/0235069 A1 | 9/2013 | Ubillos et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332262 A1 | 12/2013 | Hunt et al. |
| 2013/0332263 A1 | 12/2013 | Vora et al. |
| 2013/0346872 A1 | 12/2013 | Scott et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |
| 2014/0040377 A1 | 2/2014 | Friedman et al. |
| 2014/0040993 A1 | 2/2014 | Lorenzo et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0075004 A1 | 3/2014 | Dusen et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0189808 A1 | 7/2014 | Mahaffey et al. |
| 2014/0200989 A1 | 7/2014 | Kassko et al. |
| 2014/0222834 A1 | 8/2014 | Parikh et al. |
| 2014/0223527 A1 | 8/2014 | Bortz et al. |
| 2014/0244621 A1 | 8/2014 | Lindsay |
| 2014/0278785 A1 | 9/2014 | Gaedcke et al. |
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0337953 A1 | 11/2014 | Banatwala et al. |
| 2014/0358911 A1 | 12/2014 | McCarthy et al. |
| 2015/0006708 A1 | 1/2015 | Banke et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0067160 A1 | 3/2015 | Sridhar et al. |
| 2015/0095307 A1 | 4/2015 | Bensberg et al. |

(56) References Cited

U.S. PATENT DOCUMENTS

| | | |
|---|---|---|
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0142748 A1 | 5/2015 | Gottemukkula et al. |
| 2015/0161211 A1 | 6/2015 | Patel et al. |
| 2015/0170294 A1 | 6/2015 | Goyal et al. |
| 2015/0188907 A1 | 7/2015 | Khalid et al. |
| 2015/0193504 A1 | 7/2015 | Naidu et al. |
| 2015/0244706 A1 | 8/2015 | Grajek et al. |
| 2015/0281227 A1 | 10/2015 | Ivey et al. |
| 2015/0286643 A1 | 10/2015 | Kumar et al. |
| 2015/0288522 A1 | 10/2015 | McCoy et al. |
| 2015/0295869 A1 | 10/2015 | Li et al. |
| 2015/0310018 A1 | 10/2015 | Fan et al. |
| 2015/0310020 A1 | 10/2015 | Brav et al. |
| 2015/0310571 A1 | 10/2015 | Brav et al. |
| 2015/0312200 A1 | 10/2015 | Brav et al. |
| 2015/0334102 A1 | 11/2015 | Haugsnes |
| 2015/0347616 A1 | 12/2015 | Levi et al. |
| 2015/0381552 A1 | 12/2015 | Vijay et al. |
| 2016/0019628 A1 | 1/2016 | Udumudi et al. |
| 2016/0021097 A1 | 1/2016 | Shrotri |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1 | 2/2016 | Calistri-Yeh |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0134680 A1* | 5/2016 | Yamagishi ........... H04N 21/631 709/219 |
| 2016/0147760 A1 | 5/2016 | Anandhavelu et al. |
| 2016/0151704 A1 | 6/2016 | Wu |
| 2016/0164863 A1 | 6/2016 | Hitchcock et al. |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0212100 A1 | 7/2016 | Banerjee |
| 2016/0255034 A1 | 9/2016 | Yuan |
| 2016/0269344 A1 | 9/2016 | Anders et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0335572 A1 | 11/2016 | Bennett et al. |
| 2016/0352667 A1 | 12/2016 | Pickett et al. |
| 2017/0046112 A1 | 2/2017 | Keller et al. |
| 2017/0048237 A1 | 2/2017 | Pfitzmann et al. |
| 2017/0061248 A1 | 3/2017 | Ryan, Jr. et al. |
| 2017/0132276 A1 | 5/2017 | Saurabh et al. |
| 2017/0154356 A1 | 6/2017 | Trevisiol et al. |
| 2017/0154366 A1 | 6/2017 | Turgeman |
| 2017/0177562 A1 | 6/2017 | Scott et al. |
| 2017/0180294 A1 | 6/2017 | Milligan et al. |
| 2017/0193546 A1 | 7/2017 | Bennett et al. |
| 2017/0255536 A1 | 9/2017 | Weissinger et al. |
| 2017/0264619 A1 | 9/2017 | Narayanaswamy et al. |
| 2017/0300490 A1 | 10/2017 | Kachemir et al. |
| 2017/0344748 A1 | 11/2017 | Ghani et al. |
| 2017/0366636 A1 | 12/2017 | Wang et al. |
| 2018/0027075 A1 | 1/2018 | Schoeffler et al. |
| 2018/0041336 A1 | 2/2018 | Keshava et al. |
| 2018/0053114 A1 | 2/2018 | Adjaoute |
| 2018/0081983 A1 | 3/2018 | Carru et al. |
| 2018/0091468 A1 | 3/2018 | Yong et al. |
| 2018/0097802 A1 | 4/2018 | Lander et al. |
| 2018/0115473 A1 | 4/2018 | Sridhar et al. |
| 2018/0144389 A1 | 5/2018 | Fredrich et al. |
| 2018/0152471 A1 | 5/2018 | Jakobsson |
| 2018/0211285 A1 | 7/2018 | Todasco et al. |
| 2018/0219830 A1 | 8/2018 | O'Brien et al. |
| 2018/0267951 A1 | 9/2018 | Moah et al. |
| 2018/0278503 A1 | 9/2018 | Carey et al. |
| 2018/0293607 A1 | 10/2018 | Huddleston et al. |
| 2018/0295137 A1 | 10/2018 | Zager et al. |
| 2018/0329565 A1 | 11/2018 | Yeung et al. |
| 2018/0332079 A1 | 11/2018 | Ashley et al. |
| 2018/0337871 A1 | 11/2018 | Matta et al. |
| 2018/0337907 A1 | 11/2018 | Bhansali et al. |
| 2018/0337910 A1 | 11/2018 | Gustavson et al. |
| 2018/0367484 A1 | 12/2018 | Rodriguez et al. |
| 2018/0374374 A1 | 12/2018 | Watson et al. |
| 2019/0057204 A1 | 2/2019 | Marcovecchio et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2019/0228093 A1 | 7/2019 | Falcao et al. |
| 2019/0230151 A1 | 7/2019 | Falcao et al. |
| 2019/0245751 A1 | 8/2019 | Wong |
| 2019/0306248 A1 | 10/2019 | Swarangi et al. |
| 2019/0347984 A1 | 11/2019 | Hintermeister |
| 2019/0354709 A1 | 11/2019 | Brinskelle |
| 2020/0007530 A1 | 1/2020 | Abdul et al. |
| 2020/0051120 A1 | 2/2020 | Senftleber et al. |
| 2020/0053094 A1 | 2/2020 | Kaube et al. |
| 2020/0099676 A1 | 3/2020 | Desarda et al. |
| 2020/0104478 A1 | 4/2020 | Chauhan |
| 2020/0120068 A1 | 4/2020 | Senftleber et al. |
| 2020/0120095 A1 | 4/2020 | Senftleber et al. |
| 2020/0120096 A1 | 4/2020 | Senftleber et al. |
| 2020/0120167 A1 | 4/2020 | Senftleber et al. |
| 2020/0151829 A1 | 5/2020 | Wu |
| 2020/0184575 A1 | 6/2020 | Gaedcke et al. |
| 2020/0213251 A1* | 7/2020 | Shah ...................... H04W 4/21 |
| 2020/0258091 A1 | 8/2020 | Gaedcke et al. |
| 2020/0287957 A1 | 9/2020 | Falcao et al. |
| 2020/0329110 A1 | 10/2020 | Holzband et al. |
| 2020/0358755 A1 | 11/2020 | Abdul et al. |
| 2020/0366564 A1 | 11/2020 | Davis et al. |
| 2021/0119967 A1 | 4/2021 | Senftleber et al. |
| 2021/0174391 A1 | 6/2021 | Savage et al. |
| 2021/0176136 A1 | 6/2021 | Davis et al. |
| 2021/0226952 A1 | 7/2021 | Senftleber et al. |
| 2021/0250341 A1 | 8/2021 | Senftleber et al. |
| 2021/0256041 A1 | 8/2021 | Senftleber et al. |
| 2021/0328961 A1 | 10/2021 | Senftleber et al. |
| 2021/0357408 A1 | 11/2021 | Falcao et al. |

FOREIGN PATENT DOCUMENTS

| | | |
|---|---|---|
| EP | 2857993 B1 | 8/2017 |
| WO | 2009047674 A2 | 4/2009 |
| WO | 2013158839 A1 | 10/2013 |
| WO | 2014089460 A2 | 6/2014 |
| WO | 2014153463 A3 | 1/2015 |
| WO | 2015013436 A2 | 1/2015 |
| WO | 2019075284 A2 | 4/2019 |
| WO | 2019144159 A1 | 7/2019 |
| WO | 2020232311 A1 | 11/2020 |

OTHER PUBLICATIONS

Dinh, Khanh Q., Non-Final Office Action dated Mar. 17, 2021 for U.S. Appl. No. 16/820,697.

Dinh, Khanh Q., Notice of Allowance and Fee(s) Due dated Apr. 16, 2021 for U.S. Appl. No. 16/820,697.

Fiorillo, James N., Non-Final Office Action dated Jun. 7, 2021 for U.S. Appl. No. 16/827,625.

Frunzi, Victoria E., Final Office Action dated May 17, 2021 for U.S. Appl. No. 16/590,218.

Frunzi, Victoria E., Non-Final Office Action dated Dec. 21, 2020 for U.S. Appl. No. 16/590,218.

(56) References Cited

OTHER PUBLICATIONS

Goldberg, Ivan R., Final Office Action dated Jun. 29, 2021 for U.S. Appl. No. 16/695,098.
Goldberg, Ivan R., Final Office Action dated Jun. 29, 2021 for U.S. Appl. No. 16/701,143.
Goldberg, Ivan R., Non-Final Office Action dated Mar. 10, 2021 for U.S. Appl. No. 16/695,098.
Goldberg, Ivan R., Non-Final Office Action dated Mar. 3, 2021 for U.S. Appl. No. 16/701,143.
M. Rowe and H. Alani, "What Makes Communities Tick? Community Health Analysis Using Role Compositions," 2012 International Conference on Privacy, Security, Risk and Trust and 2012 International Conference on Social Computing, Amsterdam, Netherlands, 2012, pp. 267-276, doing:10.1109/SocialCom-PASSAT2012.18.
Mesa, Joel, Notice of Allowance and Fee(s) Due dated Feb. 24, 2021 for U.S. Appl. No. 15/782,635.
Nano, Sargon N., Notice of Allowance and Fee(s) Due dated May 19, 2021 for U.S. Appl. No. 17/026,152.
Neuman, Clifford B., Proxy-Based Authorization and Accounting for Distributed Systems, IEEE 1993 (Year: 1993).
Rashid, Ishrat, Final Office Action dated Jun. 15, 2021 for U.S. Appl. No. 15/782,653.
Rashid, Ishrat, Non-Final Office Action dated Apr. 2, 2021 for U.S. Appl. No. 15/782,653.
Shaw, Robert A., Final Office Action dated Mar. 16, 2021 for U.S. Appl. No. 16/158,169.
U.S. Appl. No. 11/333,826, filed Jan. 17, 2006 and entitled, "Knowledge Filter".
U.S. Appl. No. 11/692,169, filed Mar. 27, 2007 and entitled, "Knowledge Filter".
U.S. Appl. No. 60/158,496, filed Oct. 8, 1999 and entitled, "Knowledge Filter".
U.S. Appl. No. 60/816,100, filed Jun. 22, 2006 and entitled, "Knowledge Filter".
U.S. Appl. No. 60/816,900, filed Jun. 26, 2006 and entitled, "Knowledge Filter".
"Craigslist Online Community." Craigslist.org. Jul. 6, 2010.
Ahmed, Saba, Final Office Action dated Jun. 29, 2016 for U.S. Appl. No. 14/098,492.
Ahmed, Saba, Non-Final Office Action dated Nov. 19, 2015 for U.S. Appl. No. 14/098,492.
Anicas, Mitchell; An Introduction to OAuth 2, DigitalOcean, Published Jul. 21, 2014, Retrieved Jan. 29, 2021; <>.
Arentz et al., Classifying offensive sites based on image content [online], Computer Vision and Image Understanding 94, 295-310, 2004, Retrieved from the Internet:.
Bista, Sanat Kumar et al., "Using Gamification in an Online Community," CSIRO ITC Centre, Conference Paper, 2012.
Blaufeld, Justin R., Final Office Action dated Mar. 24, 2016 for U.S. Appl. No. 14/098,501.
Blaufeld, Justin R., Non-Final Office Action dated Sep. 24, 2015 for U.S. Appl. No. 14/098,501.
Bostock, Mike, Sankey Diagram, available at http://bost.ocks.org/mike/sankey, published May 21, 2012, 1 pg.
Brown Jr., Nathan H., Final Office Action dated Mar. 29, 2011 for U.S. Appl. No. 11/971,856.
Brown Jr., Nathan H., Non-Final Office Action dated Jun. 6, 2012 for U.S. Appl. No. 13/167,482.
Brown Jr., Nathan H., Non-Final Office Action dated Mar. 24, 2014 for U.S. Appl. No. 13/780,487.
Brown Jr., Nathan H., Non-Final Office Action dated Nov. 26, 2010 for U.S. Appl. No. 11/971,856.
Bui, Hanh Thi Minh, Non-Final Office Action dated Mar. 13, 2015 for U.S. Appl. No. 14/012,978.
Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].

Chung, Mong-Shune, Non-Final Office Action dated Jan. 29, 2016 for U.S. Appl. No. 14/098,505.
Constine, Josh, "Facebook tests notification unsubscribe button for feed posts," Aug. 9, 2010. http://www.adweek.com/socialtime/unsubscribe-button-posts/244868.
Dagnew, Saba, Final Office Action dated Feb. 12, 2020 for U.S. Appl. No. 15/581,795.
Dagnew, Saba, Non-Final Office Action for U.S. Appl. No. 15/581,795 dated Sep. 16, 2019.
Dinh, Khanh Q., Notice of Allowance and Fee(s) Due dated Oct. 29, 2019 for U.S. Appl. No. 15/877,379.
Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Falcao et al., U.S. Appl. No. 15/877,379, filed Jan. 22, 2018 and entitled, "Temporal Optimization of Data Operations Using Distributed Search and Server Management."
Falcao et al., U.S. Appl. No. 15/877,381, filed Jan. 22, 2018 and entitled, "Temporal Optimization of Data Operations Using Distributed Search and Server Management."
Fett et al., The Web SSO Standard OpenID Connect: In-Depth Formal Security Analysis and Security Guidelines, 2017 IEEE 30th Computer Security Foundations Symposium (Year: 2017).
Filipczyk, Marcin R., Final Office Action dated Oct. 5, 2015 for U.S. Appl. No. 13/950,268.
Filipczyk, Marcin R., Non-Final Office Action dated Mar. 10, 2016 for U.S. Appl. No. 13/950,268.
Filipczyk, Marcin R., Non-Final Office action dated May 22, 2015 for U.S. Appl. No. 13/950,268.
Fiorillo, James N., Non-Final Office Action for U.S. Appl. No. 15/821,543 dated Aug. 16, 2019.
Fiorillo, James N., Notice of Allowance and Fee(s) Due dated Nov. 14, 2019 for U.S. Appl. No. 15/821,543.
Friedman et al., U.S. Appl. No. 61/650,849, filed May 23, 2012 and entitled, "Dynamic Information Streams in a Social Network Platform."
Frunzi, Victoria E., Non-Final Office Action dated Oct. 16, 2018 for U.S. Appl. No. 15/018,787.
Gaedckle et al., U.S. Appl. No. 61/636,132, filed Apr. 20, 2012 and entitled, "System and Method for Providing a Social Customer Care System."
Georgandellis, Andrew C., Final Office Action dated Mar. 30, 2016 for U.S. Appl. No. 13/900,878.
Georgandellis, Andrew C., Final Office Action dated Oct. 26, 2017 for U.S. Appl. No. 13/900,878.
Georgandellis, Andrew C., Final Office Action dated Sep. 21, 2016 for U.S. Appl. No. 14/035,166.
Georgandellis, Andrew C., Non-Final Office Action dated Jan. 26, 2017 for U.S. Appl. No. 13/900,878.
Georgandellis, Andrew C., Non-Final Office Action dated Jul. 11, 2016 for U.S. Appl. No. 14/035,166.
Georgandellis, Andrew C., Non-Final Office Action dated May 23, 2017 for U.S. Appl. No. 14/035,166.
Georgandellis, Andrew C., Non-Final Office Action dated Nov. 3, 2015 for U.S. Appl. No. 13/900,878.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Goldberg, Ivan R., Final Office Action dated Jan. 12, 2015 for U.S. Appl. No. 13/835,502.
Goldberg, Ivan R., Final Office Action dated Jan. 13, 2015 for U.S. Appl. No. 13/835,250.

(56) References Cited

OTHER PUBLICATIONS

Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.
Hatcher, Deirdre D., Non-Final Office Action dated Jan. 14, 2016 for U.S. Appl. No. 13/950,258.
Holzband et al., U.S. Appl. No. 15/821,543, filed Nov. 22, 2017 and entitled, "Responsive Action Prediction Based on Electronic Messages Among a System of Networked Computing Devices."
Jang, Gijeong, Written Opinion of the International Searching Authority and International Search Report dated Jul. 28, 2015 for International Patent Application No. PCT/US2014/047866.
Jou et al., "Predicting Viewer Perceived Emotions in Animated GIFs", Nov. 3-7, 2014 (4 pages).
Kim, Harry C., Notification of Transmittal of the International Search Report and the Written Opinion of the International Searching Authority, or the Declaration dated Sep. 16, 2020 for International Patent Application No. PCT/US2020/032999.
Kolosowski-Gager, Katherine, Final Office Action dated Feb. 11, 2019 for U.S. Appl. No. 14/627,151.
Kolosowski-Gager, Katherine, Non-Final Office Action dated Jun. 29, 2018 for U.S. Appl. No. 14/627,151.
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Lithium Website, http://www.lithium.com, Dec. 11, 2010, retrieved from Internet Archive, pp. 1-9.
Liu et al., OAuth Based Authentication and Authorization in Open Telco API; International Conference on Computer Science and Electronics Engineering, 2012 (Year: 2012).
M2 PressWire, "Alterian: Social media monitoring and analytics comes of age with Alterian's acquisition of market leader Techrigy," Jul. 15, 2009, Anonymous, Norman Media Ltd, London.
Matthews, Tara, et al. "Community Insights: Helping Community Leaders Enhance the Value of Enterprise Online Communities." Proceedings of the SIGCHI Conference on Human Factors in Computing Systems, April 27-May 2, 2013, Paris, France. ACM (2013). pp. 513-522.
Meng, Jau Shya, Non-Final Office Action dated Jan. 3, 2020 for U.S. Appl. No. 15/877,381.
Meng, Jau Shya, Non-Final Office Action dated Jun. 16, 2020 for U.S. Appl. No. 15/877,381.
Mesa, Joel, Final Office Action dated Mar. 30, 2020 for U.S. Appl. No. 15/782,635.
Mesa, Joel, Non-Final Office Action for U.S. Appl. No. 15/782,635 dated Oct. 4, 2019.
Mesa, Joel, Non-Final Office Action dated Oct. 6, 2020 for U.S. Appl. No. 15/782,635.
Mosley, Kyle T., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Netzloff, Eric R., Non-Final Office Action dated Nov. 25, 2014 for U.S. Appl. No. 13/848,706.
Netzloff, Eric R., Non-Final Office Action dated Nov. 6, 2018 for U.S. Appl. No. 14/824,021.
Niruntasukrat et al., Authorization Mechanism for MQTT-based Internet of Things, IEEE ICC 2016 Workshops: W07—Workshop on Convergent Internet of Things (Year: 2016).
Ofori-Awuah, Maame, Final Office Action dated Oct. 2, 2020 for U.S. Appl. No. 14/929,209.
Ofori-Awuah, Maame, Final Office Action dated Sep. 6, 2019 for U.S. Appl. No. 14/929,209.
Ofori-Awuah, Maame, Non-Final Office Action dated Apr. 5, 2019 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Olshannikov, Alex, Non-Final Office Action dated Oct. 22, 2015 for U.S. Appl. No. 14/098,509.
Perungavoor, Venkatanaray, Notice of Allowance and Fee(s) Due for U.S. Appl. No. 16/158,167, dated May 15, 2020.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Rashid, Ishrat, Final Office Action for U.S. Appl. No. 15/782,653 dated Sep. 19, 2019.
Rashid, Ishrat, Non-Final Office Action dated Jun. 11, 2019 for U.S. Appl. No. 15/782,653.
Rashid, Ishrat, Non-Final Office Action dated Jun. 12, 2020 for U.S. Appl. No. 15/782,653.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools to Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multi-Factor Authentication Using Credential and Authentication Management in Scalable Data Networks."
Suh, Andrew, Non-Final Office Action dated Jul. 8, 2020 for U.S. Appl. No. 16/158,172.
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.
Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.
Takesue, Masaru, An HTTP Extension for Secure Transfer of Confidential Data. IEEE, 2009 (Year: 2009).
Thomas, Shane, Written Opinion of the International Searching Authority and International Search Report dated Aug. 16, 2013 for International Patent Application No. PCT/US2013/037107.
Trapanese, William C., Non-Final Office Action dated May 27, 2020 for U.S. Appl. No. 16/413,577.
Vo, Huyen X., Non-Final Office Action dated Mar. 15, 2019 for U.S. Appl. No. 15/782,642.
Vo, Huyen X., Non-Final Office Action dated Oct. 15, 2020 for U.S. Appl. No. 16/458,183.
Walsh, John B., Non-Final Office Action dated Mar. 24, 2017 for U.S. Appl. No. 14/702,696.
Wang, Xiaoqing, and Shannon Lantzy. "A Systematic Examination of Member Turnover and Online Community Health." Thirty Second International Conference on Information Systems, Shanghai (2011), pp. 1-11.

(56) References Cited

OTHER PUBLICATIONS

Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods to Monitor Health of Online Social Communities."
Young, Lee W., Notification of Transmittal of the International Search Report and the Written Opinion of the International Searching Authority, or the Declaration, dated Apr. 1, 2019 for International Application No. PCT/US2018/05545.
Young, Lee W., Written Opinion of the International Searching Authority and International Search Report dated May 28, 2014 for International Patent Application No. PCT/US2013/073625.
Young, Lee W.; Notification of Transmittal of the International Search Report and the Written Opinion of the International Searching Authority, or the Declaration dated Jun. 24, 2019 for International Application No. PCT/US2019/014637.
Goldberg, Ivan R., Final Office Action dated Jan. 15, 2015 for U.S. Appl. No. 13/865,429.
Goldberg, Ivan R., Non-Final Office Action dated Apr. 13, 2016 for U.S. Appl. No. 13/865,429.
Goldberg, Ivan R., Non-Final Office Action dated Jun. 18, 2014 for U.S. Appl. No. 13/835,250.
Goldberg, Ivan R., Non-Final Office Action dated Jun. 18, 2014 for U.S. Appl. No. 13/835,502.
Goldberg, Ivan R., Non-Final Office Action dated Jun. 20, 2014 for U.S. Appl. No. 13/865,411.
Goldberg, Ivan R., Non-Final Office Action dated Jun. 23, 2014 for U.S. Appl. No. 13/865,429.
Hardt, Dick, The OAuth 2.0 Authorization Framework draft-ieft-oauth-v2-31; Internet Engineering Task Force (IEFT) (Year: 2012).
Senftleber et al., U.S. Appl. No. 16/194,126, filed Nov. 16, 2018 and entitled, "Multiplexed Data Exchange Portal Interface in Scalable Data Networks."
Shaw, Robert A., Non-Final Office Action dated Jan. 22, 2021 for U.S. Appl. No. 16/158,169.
Singh, Amardeep, IP Australia, Examination Report No. 1 for Australia Patent Application No. 2019209542 dated Dec. 17, 2020.
Spasojevic et al., U.S. Appl. No. 61/943,047, filed Feb. 21, 2014 and entitled, "Domain Generic Large Scale Topic Expertise & Interest Mining Across Multiple Online Social Networks."
Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm?d=2788584.
Suh, Andrew, Final Office Action dated Dec. 3, 2020 for U.S. Appl. No. 16/158,172.
European Patent Office, Extended European Search Report dated Nov. 12, 2021 for European Patent Application No. 19741372.7.
Fiorillo, James N., Final Office Action dated Sep. 27, 2021 for U.S. Appl. No. 16/827,625.
Fiorillo, James N., Notice of Allowance and Fee(s) Due dated Nov. 24, 2021 for U.S. Appl. No. 16/827,625.
Leimeister et al., "Success factors of virtual communities from the perspective of members and operators: An empirical study," Proceedings of the 37th Hawaii International Conference on Systems Sciences 2004, IEEE, pp. 1-10 (Year: 2004).
Ofori-Awuah, Maame, Non-Final Office Action dated Sep. 28, 2021 for U.S. Appl. No. 14/929,209.
Rashid, Ishrat, Non-Final Office Action dated Dec. 22, 2021 for U.S. Appl. No. 15/782,653.
Shaw, Robert A., Non-Final Office Action dated Dec. 27, 2021 for U.S. Appl. No. 16/158,169.

\* cited by examiner

SYNCHRONICITY OF ELECTRONIC MESSAGES VIA A TRANSFERRED SECURE MESSAGING CHANNEL AMONG A SYSTEM OF VARIOUS NETWORKED COMPUTING DEVICES

FIELD

Various embodiments relate generally to data science and data analysis, computer software and systems, and control systems to provide a platform to facilitate implementation of an interface, among other things, and, more specifically, to a computing and data platform that implements logic to facilitate transfer of an exchange of electronic messages to a secure messaging channel having configurable states of synchronicity based on one or more message-related attributes.

BACKGROUND

Advances in computing hardware and software have fueled exponential growth in delivery of vast amounts of information due to increased improvements in computational and networking technologies. Also, advances in conventional data network technologies provide an ability to exchange increasing amounts of generated data via various electronic messaging platforms. Thus, improvements in computing hardware, software, network services, and storage have bolstered growth of Internet-based messaging applications, such as social networking platforms and applications, especially in an area of generating and sending information concerning products and services to facilitate customer care operations. For example, various organizations and corporations (e.g., retailer sellers) may exchange information through any number of electronic messaging networks, including social media networks. Such entities aim to respond quickly and efficiently to messages from customers (and potential customers) to manage brand loyalty and reputation, and to bolster customer engagement.

And since different customers prefer communicating over different communication channels (e.g., social media networked channels) and various different data networks, traditional customer-relationship management ("CRM") computing systems and processes are not well-suited to adapt to engage customers and associated computing devices at convenience of the customers "on-the-go."

Further, conventional customer care computing systems and processes customer care technologies typically implement legacy chat platforms (e.g., on web sites) to engage customer messaging. Traditional chat technologies typically rely on session-based chat technology that force customers to remain actively engaged via an active chat session. Customer frustration and dissatisfaction is typically projected unto a corporation and its brand due to the relatively long periods of time spent waiting for a reply from an agent.

Moreover, agents that service customer messages using conventional customer care systems and computerized processes are usually incentivized to close sessions as quickly as possible as their individual performance is evaluated negatively due to long chat sessions. Lengthy chat sessions also negatively affect workflow and agent resource management, which, in turn, results in suboptimal experiences by both customer and agent, and higher operational costs.

Thus, what is needed is a solution for facilitating techniques that optimize computer utilization and performance associated with servicing electronic messages, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
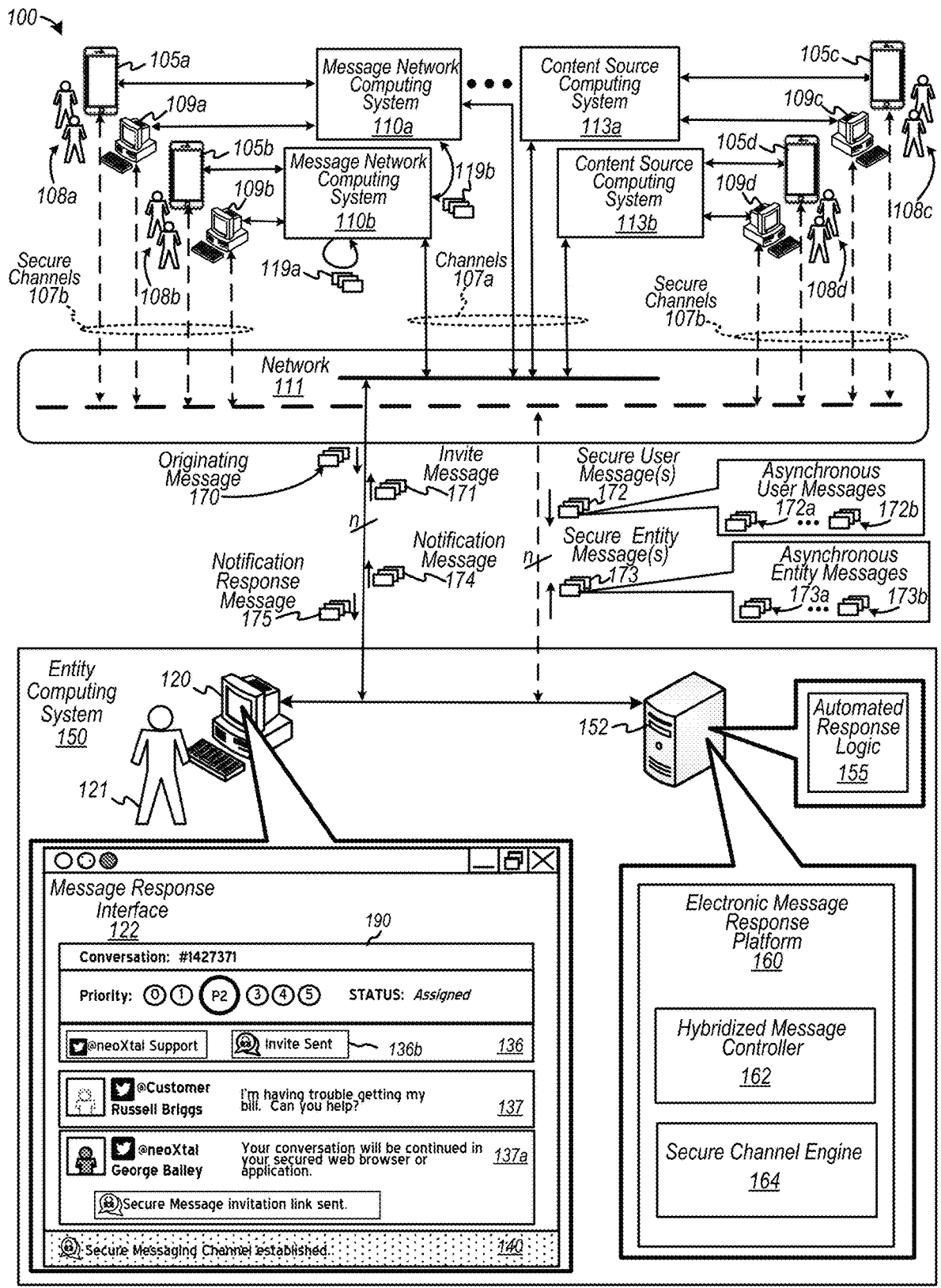
FIG. 1 is a diagram depicting an electronic message response platform, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Wash., FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS").

Further, references to databases, data structures, or any type of data storage facility may include any embodiment as a local, remote, distributed, networked, cloud-based, or combined implementation thereof. For example, social networks and social media (hereafter "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering, content sharing, or like purposes. Data may be generated in various formats such as text, audio, video (including three dimensional, augmented reality ("AR"), and virtual reality ("VR"), or others, without limitation, for use on social networks, social media, and social applications (hereafter "social media") such as Twitter® of San Francisco, Calif., Snapchat® as developed by Snap® of Venice, Calif., Messenger as developed by Facebook®, WhatsApp®, or Instagram® of Menlo Park, Calif., Pinterest® of San Francisco, Calif., LinkedIn® of Mountain View, Calif., and others, without limitation or restriction.

In some examples, data may be formatted and transmitted (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others.

FIG. 1 is a diagram depicting an electronic message response platform, according to some embodiments. Diagram 100 depicts an example of an entity computing system 150 including an electronic message response platform 160 that may be configured to, among other things, facilitate transfer of an exchange of one or more electronic messages to a secure messaging channel having configurable states of synchronicity based on, for example, one or more message-related attributes. In various examples, an exchange of one or more electronic messages associated with electronic message response platform 160 may be directed to addressing an issue (e.g., a customer service) affiliated with branded product or service.

Diagram 100 depicts an entity computing system 150 including a user interface 120 and a computing device 152 (e.g., one or more servers, including one or more processors and/or memory devices), both of which may be configured to generate "response" messages that may be configured for consumption at or adjacent users 108a, 108b, 108c, and 108d. In the example shown, user 108a may be associated with one or more computing devices, such as mobile computing device 105a and any type of computing device 109a, user 108b may be associated with one or more computing devices, such as mobile computing device 105b and any type of computing device 109b, user 108c may be associated with one or more computing devices, such as mobile computing device 105c and any type of computing device 109c, and user 108d may be associated with one or more computing devices, such as mobile computing device 105d and any type of computing device 109d. Note that any number of mobile computing devices, and other computing devices may be configured to exchange messages and are not limited to those shown. Any of mobile computing devices 105a to 105d and any of computing devices 109a to 109d may be configured to generate electronic messages to, for example, initiate an exchange of messages with electronic message response platform 160. In some examples, an electronic message generated initially at mobile computing devices 105a to 105d and any of computing devices 109a to 109d may be referred to as originating message 170, at least in some examples. Note that an exchange of messages may describe asynchronous or synchronous transmission of messages (or a combination thereof per message) that may constitute a "conversation," which may terminate upon closure or resolution of a topic or the content of message 170.

Any one or more of message network computing systems 110a and 110b (including one or more applications) may be configured to receive and transmit electronic messages, regardless of a context, to convey an inquiry, experience, observation, request for assistance (e.g., in relation to a product or service), or any other information with or among any number of users for any reason. One or more of message network computing systems 110a and 110b may be configured to communicate electronic message content in any form in any digital media or channel 107a. Also, one or more computing systems 113a and 113b may be configured to communicate electronic message content in any form in any digital media or channel 107a.

Electronic message response platform 160 may be configured to receive an electronic message, such as originating message 170, via any of channels 107a. Originating message 170 may include any of electronic messages 119a (e.g., intra-system messages), electronic messages 119b (e.g., inter-system messages), or any other message. In some cases, electronic messages 119a and 119b need not be directed to example of an entity computing system 150 for evaluation by electronic message response platform 160. For example, a messaging account associated with entity computing system 150 may be accessed or otherwise configured to transmit originating message 170 to electronic message response platform 160.

In various examples, message network computing systems 110a and 110b may include any number of computing systems configured to propagate electronic messaging, including, but not limited to, computing systems including third party servers, such as third parties like Facebook™, Twitter™, LinkedIn™, Instagram™, Snapchat™ as well as other private or public social networks to provide social-media related informational data exchange services. Hence, message network computing systems 110a and 110b may include any social network computing system. Computing systems 113a and 113b (including one or more applications, such as text messaging applications) may be configured to provide any type of digital content, such as email, text messaging (e.g., via SMS messaging, Multimedia Messaging Service ("MMS"), WhatsApp™, WeChat™ Apple® Business Chat™, Instagram™ Direct Messenger, etc.), web pages, audio, video (e.g., YouTube™), etc.

According to some examples, message network computing systems 110a and 110b may include applications or executable instructions configured to principally facilitate interactions (e.g., social interactions) amongst one or more persons, one or more subpopulations (e.g., private groups or public groups), or the public at-large. Examples of message network computing systems 110a and 110b, as channels 107b, may include the above-mentioned electronic accounts for Facebook™, Twitter™, LinkedIn™ Instagram™, and Snapchat™, as well as YouTube™, Pinterest™, Tumblr™, WhatsApp™ messaging, or any other platform configured to promote sharing of content, such as videos, audio, or images, as well as sharing ideas, thoughts, etc. in a socially-based environment. According to some examples, content source computing systems 113a and 113b may include applications or executable instructions configured to principally promote an activity, such as a sports television network, a profession sports team, a news or media organization, a product producing or selling organization, and the like. Content source computing systems 113a and 113b may implement websites, email, chatbots, or any other digital communication channels, and may further implement electronic accounts to convey information via message network computing systems 110a and 110b.

In some examples, structures and/or functions of message network computing systems 110a and 110b and content source computing systems 113a and 113b may be implemented to operate similarly or equivalently as each other. Any electronic message may include a "tweet" (e.g., a message via a Twitter™ computing system), a "post" (e.g., a message via a Facebook™ computing system), or any other type of social network-based messages, along with any related functionalities, such as forwarding a message (e.g., "retweeting" via Twitter™), sharing a message, associating an endorsement of another message (e.g., "liking" a message, such as a Tweet™, or sharing a Facebook™ post, etc.), and any other interaction that may convey or otherwise may generate a "response" to one or more electronic accounts at relatively increased rates of transmissions or propagation to address concerns or statements that may otherwise affect a reputation of a brand. According to various examples, an electronic message received via a network 111 can include any type of digital messaging that can be transmitted over any digital network (e.g., the Internet, etc.).

Entity computing system 150 is shown to include a computing device 120 and display configured to generate a user interface, such as a message response interface 122. Entity computing system 150 also includes a server computing device 152, which may include hardware and software, or a combination thereof, configured to implement an electronic message response platform 160 (or "response platform 160") configured to route an exchange of messages over a secure communication channel 170b, whereby the exchange of messages may be communicated either asynchronously or synchronously, or a combination thereof, based on at least one or more attributes of an electronic message, such as originating message 170, as well as user-related data, contextual data, and other data, according to various examples.

Response platform 160 may include a hybridized message controller 162 configured to characterize one or more received electronic messages (e.g., messages 119a, 119b, and 170 received via a network 111), and to variably route response each of electronic messages either asynchronously or synchronously based on, for example, one or more characterized messages. Response platform 160 also may include a secure channel engine 164 configured to transfer originating message 170 and subsequent exchanges of electronic messages via secure channels 107b. Secure channel engine 164 may also be configured to monitor availability of a secure data channel 107b (or a channel 107a) associated with an exchange of messages with a user computing device, such as mobile computing device 105*a*, whereby absence or availability of a communication channel with mobile computing device 105*a* may influence whether such communications may be asynchronous or synchronous. Also, electronic message response platform 160 may be configured to generate and send response electronic messages to any of platforms 110*a*, 110*b*, 113*a*, and 113*b*.

To illustrate a functionality of response platform 160, consider an example in which mobile computing device 105*a* generates an originating electronic message 170 associated with message network computing system 110*a* (e.g., Twitter computing systems), whereby message 170 may be directed to returning a product, such as a pair of gloves, associated with entity computing system 150. As an example, consider that message 170 is directed to an entity, such as a retailer or corporation, named "Rocks and Rope," which is a purveyor of outdoor and climbing equipment. Message 170 may include text directed to an inquiry how to return "climbing gloves," after which an exchange of message may be securely exchanged to resolve an issue.

Response platform 160 may be configured to detect electronic message 170 originates via a data channel 107*a*, which may be one of any number of data channels 107*a*, whereby at least one data channel 107*a* may be public or otherwise non-secure relative to types of data exchanged. Response platform 160 also may be configured to determine a security state associated with one of data channels 107*a* associated with electronic message 170. If data channel 107*a* is detected as having a non-secure security state (e.g., data accessible by a third party entity, such as an owner of one of platforms 110*a*, 110*b*, 113*a*, and 113*b*), secure channel engine 164 may be configured to generate and transmit data representing an invitation message 171 to mobile computing device 105*a* to initiate transfer of an exchange of electronic messages to a secure data channel 107*b*. In some examples, the transfer may be based on contents of electronic message 170 and any other data associated therewith. Invitation message 171 may include any data configurable to facilitate access to, for example, a link (e.g., a hyperlink), or other data, to establish secure data channel 107*b*. Secure channel engine 164 may be further configured to receive data via channels 107*a*, 107*b*, or any other electronic communication data channel representing confirmation that user 108*a* and/or mobile computing device 105*a* urges electronic communication via secure channels 107*b*.

Hybridized message controller 162 may be configured to identify and/or characterize one or more attributes based on data representing the content of message 170. Further, hybridized message controller 162 may be configured to analyze data representing characterized content (e.g., attributes) to determine one or more actions (e.g., algorithmic actions) to respond to message 170. Based on characterization of message 170, hybridized message controller 162 may be configured to route data associated with message 170 to automatic response logic 155 and/or computing device 120 to generate a response to message 170, for example, as a function of message attributes, agent resource availability, and the like. In cases in which message 170 is routed to computing device 120, an agent 121 may be able to provide a user-centric service (e.g., data directed to a personalized experience). In some cases, computing device 120 may be configured to facilitate an agent-assisted response. In some examples, automatic response logic 155 may be configured to implement automatic responses to generate a response configured to address the content of message 170 as a message in an exchange of messages. Automatic response logic 155 may include executable instructions representing an application, a script, a "bot," or any other automated algorithms to generate an automated response adapted to characterized content of message 170.

In at least one embodiment, hybridized message controller 162 may be configured to hybridize (e.g., blend or mix) an exchange of electronic messages of a conversation by implementing any number of implementations of automatic response logic 155 or any number of computing devices 120 (e.g., associated with any number of agents 121). Further, hybridized message controller 162 may be configured to hybridize an exchange of electronic messages based on synchronicity (e.g., whether to communicate a message synchronously or asynchronously). In this case, hybridized message controller 162 may be configured to blend or mix response messages as function of time or any other criteria, such as priority, degree of urgency, etc. That is, hybridized message controller 162 may be configured to selectively determine whether to generate and transmit a response message synchronously or asynchronously.

As shown, secure channel engine 164 may be configured to generate one or more secure channels 107*b* over which secure messages may be exchanged. In this example, messages generated at any computing device 105 or 109 may be transmitted via secure channel 107*b* as secure user message(s) 172, and messages generated at computing device 152 may be transmitted via secure channel 107*b* as secure entity message(s) 173. Diagram 100 depicts that secure user message(s) 172 and secure entity message(s) 173 may be exchanged (i.e., asynchronously) as asynchronous user messages 172*a* and 172*b* and asynchronous entity messages 173*a* and 173*b*, respectively (e.g., "session-less" messaging). Therefore, any data exposed in messages communicated via channels 107*a* may be concealed or otherwise secured from inadvertent or public exposure. In some examples, at least one of secure entity messages 173 may be transmitted as a function of availability of channel 107*a* or 107*b* (e.g., a data connection may exist between a user computing device and response platform 160).

In some examples, secure channel engine 164 may be configured to monitor whether a data connection may exist between a user computing device 105 or 109 and response platform 160. As an example, user 108*a* may be distracted during a time period or otherwise may abandon a conversation or (potential) exchange of messages due to various personal commitments. However, electronic message response platform 160 may be configured to maintain a state of a conversation (i.e., exchange of electronic messages) so that an associated user may be able to pick up or re-engage at a time convenient for any user 108.

In an event user 108 or any computing devices 105 and 109 are idled or otherwise unavailable (e.g., a network connection is unavailable), electronic message response platform 160 may be configured to provide for asynchronous communication. In one example, consider any computing devices 105 and 109 may be associated with a communication path that is unavailable (e.g., a computing device may be off-line or a user may not be engaged, and thus unavailable). In some cases, hybridized message controller 162 may be configured to generate a notification message 174 for transmission via, for example, channel 107*a* to notify computing devices 105 and 109 (or associated user 108) that a response may be awaiting access via secure channel 107*b*. Note that response platform 160 may be configured to provide for asynchronous communication based on other factors other than whether a recipient computing device 105 or 109 are available. For example, response platform 160 may be configured to modulate between synchronous and asynchronous communications as a function of priority (in responding to a particular subset of users) and/or as function of workflow or agent availability (e.g., as managed to optimize agent productivity). In some examples, notification message 174 may be transmitted as a function of availability of channel 107a or 107b (e.g., a data connection may exist between a user computing device and response platform 160).

In some examples, any computing device 105 or 109 may be configured to respond to notification message 174 to re-establish a secured communication channel over which exchanges of electronic messages may continue. Upon re-engaging with a conversation, any user 108 may cause any computing device 105 or 109 to transmit a notification response message 175 that may be configured to re-establish secure channel 107b over which electronic messages may be exchanged to drive towards a resolution satisfactory to a customer or user 108.

According to some embodiments, agent 121 may interact with computing device 120 to generate a response electronic message 172 via message response interface 122, otherwise automated response logic 155 may be configured to generate an automated response. In some implementations, agent 121 may initiate or facilitate functionalities regarding the processing of a response message. Agent 121 may be presented user inputs to interact with user interface portion 190 of message response interface 122. As shown, a conversation (e.g., conversation ID #1427371) of exchanged electronic messages is depicted relative to interface portion 190. Originating message 170, or at least a portion of which, may be displayed in user interface portion 137. In this example, agent 121 can provide a response 137a indicating an invite message 171 is or has been sent to establish a secure channel. In at least one example, a user 108 may cause activation of a secure channel 107b, which may be conveyed in user interface portion 140.

In view of the foregoing, structures and/or functionalities depicted in FIG. 1 as well as other figures herein, illustrate one or more applications, algorithms, systems and platforms to detect, evaluate, analyze, identify, track, communicate, and/or resolve one or more issues associated with an entity product or service (e.g., "brand") in response to an electronic message directed to, for example, a customer care-related data event, according to some embodiments.

According to one or more examples, response platform 160 may be configured to transfer originating message 170 and subsequent exchanges of electronic messages from channels 107a to secure channels 107b. As channels 107a may be "public" or otherwise owned or accessible by third parties, messaging network computing system 110 may be exposed to sensitive customer or user-specific. As such, response platform 160 may enable entity computing system 150 associated with a "brand" to address issues detected on a public channel 107a in a manner that protects data and the privacy of users 108a to 108d. Thus, a "brand" entity may maintain control and ownership of user and customer data.

According to one or more examples, secure electronic messages maybe transmitted and associated with a token for maintaining a state of conversation during, for example, asynchronous communications among different user computing devices, different user-based applications (e.g., text message applications), different public or social network channels, and in connection with different agents (e.g., based on agent availability). In some examples, user profile information, a conversation history, and other information may be encrypted an transmitted to enable conversation histories persist so that customers need not experience issues of chat messaging that rely, for example, on session-based messaging.

According to one or more examples, logic may be configured (e.g., via configuration rules) to determine when and what to present via a chat interface window to a brand customer (e.g., timing of presentation may be based on priority, agent work force availability and management, etc.). Further, the application may be configured to render a user interface and user inputs to enable persons to manage brand-owned messaging (e.g., chat messaging) without requiring specialized knowledge to "code" or develop customized messaging.

According to one or more examples, response platform 160 may be configured to generate and transmit responses in an exchange of messages either synchronously or asynchronously adapted to a user, workflows, and/or availability of agents 121 to provide responses. Therefore, electronic message response platform 260 may be configured to provide flexibility to customers to enable them to engage on their own time rather than being committed to a synchronous window of time before a session ends (based on variable configurable states of synchronicity). According to some examples, response platform 160 may be configured to enable agents 121 to handle relatively higher volumes of conversations per unit time.

According to one or more examples, response platform 160 may be configured to notify any user 108a to 108d that a response may be available for access via secure channel 107b, thereby enabling users to resolve issues "on-the-go" without being shackled to synchronous chat sessions. Thus, a user may need not be tied to a session-based chat session, or the equivalent, to resolve an issue. The issue may be resolve at the convenience of the user, thereby improving customer satisfaction and brand loyalty.

In some embodiments, hybridized message controller 162 may be configured to characterize message 170 such that a secured exchange of message may not be necessitated (e.g., personal or private data need not be divulged or made public). As such, exchange of messages may be facilitated 173 and 173 via channels 107a, at least in some cases.

Any of described elements or components set forth in FIG. 1, and any other figure herein, may be implemented as software, applications, executable code, application programming interfaces ("APIs"), processors, hardware, firmware, circuitry, or any combination thereof.

Figure 2:
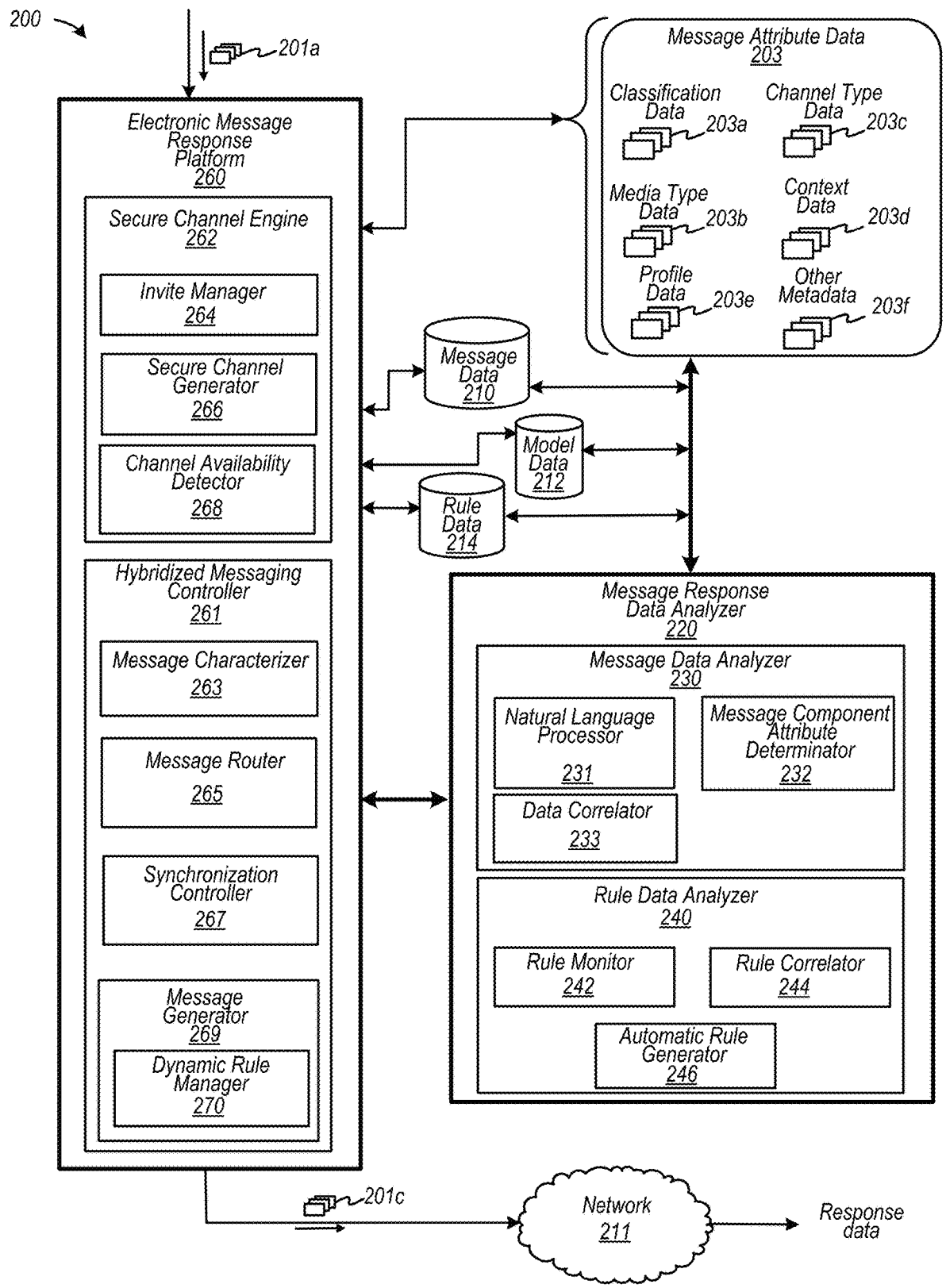
FIG. 2 depicts another example of an electronic message response platform, according to various examples.

FIG. 2 depicts another example of an electronic message response platform, according to various examples. Diagram 200 depicts a response platform 260 including a secure channel engine 262 and a hybridized messaging controller 261, and may include or otherwise communicate with a message response data analyzer 220. Entity computing system and/or response platform 260 may include structures and/or functionalities set forth in FIG. 1, and may include additional structures and/or functionalities described in FIG. 2 and elsewhere herein. In one or more implementations, elements depicted in diagram 200 of FIG. 2 may include structures and/or functions as similarly-named or similarly-numbered elements depicted in other drawings.

In this example, secure channel engine 262 may include an invite manager 264, a secure channel generator 266, and a channel availability detector 268. Invite manager 264 may be configured to receive a control data signal from, for example, hybridized messaging controller 261 indicating that an electronic message 201a ought to be transferred to a secure messaging data channel. Invite manager 264 further may be configured to generate data representing an invite message including, for example, a link or any other electronic-based mechanism or data construct to invite a user to transfer a conversation or exchange of electronic messages to a secure data channel.

Secure channel generator 266 may be configured to generate a secure data channel, for example, through which electronic messages may be exchanged securely to maintain confidentially between computing devices and systems for both a customer and a brand-based entity. According to some examples, secure channel generator 266 may be configured to encrypt or otherwise obfuscate exchanges of messages between a customer and an agent, or any other automated response logic (e.g. machine learned or an AI-based set executable instructions, a "bot," an application, etc.). Secure channel generator 266 may be configured to facilitate generation of encrypted agent-assisted responses, among others, that may be configured to maintain a state of a conversation (e.g., exchange of messages) independent of time (e.g., asynchronously), agent (e.g., due to workforce constraints and resources) or agent computing device, or independent of any other attribute of a message, a customer, a product, external information (e.g., data indicating one or more airports may be experiencing flight delays), among other things. Thus, with a maintained state of exchanges of messages, any agent or agent-computing device may be apprised (e.g., via confidential data) of information to optimally address a conversation of exchange of messages between a customer and a brand-centric platform of computing devices. In view of the foregoing, a customer may initiate a conversation (e.g., a chat session) that may be interrupted and/or electronically disconnected, whereby secure channel generator 266 may be configured to ensure a secure communication path is available to resolution of any issue.

Channel availability detector 268 may be configured to detect availability of a communication channel with which a customer and an agent may exchange data in real-time (or near real-time). For example, channel availability detector 268 may be configured to detect whether a session exists between computing devices associated with a customer and an agent. In some examples, channel availability detector 268 may be configured to monitor whether a data connection may exist between a user computing device and response platform 260. As an example, a user may be distracted during a time period or otherwise may abandon a conversation or (potential) exchange of messages due to various personal commitments. However, electronic message response platform 260 may be configured to maintain a state of a conversation (i.e., exchange of electronic messages) so that an associated user may be able to pick up or re-engage at a time convenient for any user. In an event user or any computing device are idled or otherwise unavailable (e.g., a network connection is unavailable), electronic message response platform 260 may be configured to provide for asynchronous communication to resolve any issue raised in the exchange of electronic messages. For example, a response electronic message, such as message 201*c*, may be stored at (e.g., in memory) or in association with response platform 260 and message 201*c* may be transmitted via a secured data channel through a network 211.

Further, channel availability detector 268 may be configured to detect whether a user and/or associated computing device may be available (e.g., via data channel 107*a* or any other electronic data channel). For example, channel availability detector 268 may be configured to determine whether an exchange of messages, such during a session, may be feasible. In some examples, channel availability detector 268 may be configured to generate a notification message for transmission, for example, via a non-secure data channel to notify computing devices associated with a user-customer that a response may be awaiting access via a secure channel. Therefore, channel availability detector 268 may be configured to facilitate modulation between synchronous and asynchronous communications as a function of time and/or priority (in responding to a particular subset of users) and/or as function of workflow or agent availability (e.g., as managed to optimize agent productivity), or any other message characteristic or attribute. For example, channel availability detector 268 may be configured to detect a notification response message via a channel (e.g., a non-secure or a secure channel) to receive another electronic message to continue exchange of electronic messages toward, for example, resolution of a topic or issue of a brand or organization.

Further to this example, hybridized messaging controller 261 may include a message characterizer 263, a message router 265, a synchronization controller 267, and a message generator 269, according to at least some embodiments. Message characterizer 263 may be configured to characterize various components to discover characteristics or attributes related to a component of a message or any other relatable data thereof. In some examples, message characterizer 263 may be configured to include or access message response data analyzer 220 to characterize one or more messages 201*a*. In some examples, message characterizer 263 and/or message response data analyzer 220 each (or in cooperation) may be configured to characterize a message 201*a* to determine or predict various characterized attributes with which to generate a response (e.g., based on priorities, agent availability to skillfully respond, specialized user status, such as a loyal customer, or other customer requirements, etc.).

Message characterizer 263 may be configured to characterize, for example, a "newly-received" message 201*a* for comparison against a data model in model data repository 212 to form a set of characterized data. Thus, message characterizer 263 may be configured to identify attributes and corresponding attributes that may be matched, as a data pattern, against patterns of data including correlated datasets stored in, for example, model data 212. Matching patterns facilitates correlating characteristics to optimal responses (e.g., rules), which, in turn, may serve as a basis with which to route message 201*a* to either automatic response logic or an agent computing device, or the like, or to determine whether to transmit a response message 201*c* asynchronously or synchronously during each unit of time (e.g., period of time). In various examples, one or more rules implemented in executable instructions may be configured to generate an optimized response, such as automatically generated or blended with agent-assisted responses.

Message characterizer 263 may be configured to characterize content of message 201*a* to identify or determine one or more attributes such as, for example, a status of an author or customer, an associated URL, a referrer computing device, application, website, or link, one or more site visits, a number of days since a customer last interacted digitally with a web site or application, an amount of time on a web page or web site, meta and cookie-related data, a location (including GPS coordinates, city, country, etc.), an operating system, a type of browser application, a device type (e.g., a hardware identification of a computing device), a MAC ID, an IP address, and other message attribute that may be characterized. One or more message characteristics may facilitate characterization or classification of an exchange of messages to, for example, enable routing one or more characterized messages to one or more automated response logic modules (e.g., bot applications) or one or more agent computing devices based on a value indicative of a message characteristic. In various examples, a characteristic may be (or may be derived based on any number of characteristics) indicative of a priority value, one or more values associated with one or more portions of the content of electronic message (e.g., as described herein, such as user or customer attributes, etc.), one or more or more tags associated with one or more values, availability of the agent-assisted response, as well as any other characteristic or attribute.

Message characterizer 263 and/or message response data analyzer 220 may be configured to detect and parse the various components of an electronic message, and further is configured to perform analytics to analyze characteristics or attributes of one or more message components. Message response data analyzer 220 is shown to include a natural language processor 231 and a message component attribute determinator 232. Natural language processor 231 may be configured to ingest data to parse portions of an electronic message (e.g., using word stemming, etc.) for identifying components, such as a word or a phrase. Also, natural language processor 231 may be configured to derive or characterize a message as being directed to a particular topic or subject matter based on, for example, sentiment analysis techniques, content-based classification techniques, and the like. In some examples, natural language processor 231 may be configured to apply word embedding techniques in which components of an electronic message may be represented as a vector, which may be a data arrangement for implement machine learning, deep learning, and other artificial intelligence-related algorithmic functions.

Message component attribute determinator 232 may be configured to identify characteristics or attributes, such as message attribute data 203, for a word, phrase, topic, etc. In various examples, message attribute data 203 may be appended, linked, tagged, or otherwise associated with a component to enrich data in, for example, message data repository 210 and/or model data repository 212. A classification value may be a characteristic or an attribute of a message component, and thus may be used as a "tag." Examples of message attribute data 203 are depicted as classification data 203a (e.g., an attribute specifying whether a component or message may be classified as generating, for example, a response or ought to be routed to either an automated response logic or an agent computing device), media type data 203b (e.g., an attribute specifying whether a component may be classified as being associated with a Tweet™, an email, a post, a webpage, a text message, etc.), channel type data 203c (e.g., an attribute specifying whether a component may be associated with a type of social networking system, such as Twitter™), and the like. Message attribute data 203 may also include context metadata 203d, which may include attributes that specify environmental data or contextual data, such as a context in which an electronic message is received or a response is generated. Thus, context metadata 203d may include data representing a time of day, a year, a season, a service-related context, a payment-related context, etc.

Also, message component attribute determinator 232 may be configured to generate a tag including metadata 203d may refer to a context in which a word is used in a transmission of a number of electronic messages (e.g., a tag indicating a marketing campaign, a tag directed to a delayed aircraft on which a customer is to board, or the like). Also, a tag including metadata 203d may refer to an industry or activity (e.g., a tag indicating an electronic message component relating to autonomous vehicle technology, or basketball), etc. Furthermore, message attribute data 203 may also include profile data 203e, which may include attributes that describe, for example, demographic data regarding an author or a customer of a received electronic message, or the like. Other metadata 203f may be associated with, or tagged to, a word or other message component. As such, other metadata 203f may include a tag representing a language in which the word is used (e.g., a tag indicating English, German, Mandarin, etc.). In some cases, other metadata 203d may include data representing values of computed threshold values or classification values (e.g., a tag may indicate a value of an amount of likelihood of generating a response, etc.). Message attribute data 203, and the corresponding tags, may be stored in message data repository 210.

Data correlator 233 may be configured to statistically analyze components and attributes of electronic messages to identify predictive relationships between, for example, an attribute and a value predicting a likelihood that a received electronic message may invoke a specific response message, which may be augmented or completed by automatic response logic, an agent, or a combination thereof. According to some embodiments, data correlator 233 may be configured to classify and/or quantify various "attributes" and/or "received electronic messages" (and exchanges thereof) by, for example, applying machine learning or deep learning techniques, or the like. In one example, data correlator 233 may be configured to segregate, separate, or distinguish a number of data points (e.g., vector data) representing similar (or statistically similar) attributes or received electronic messages, thereby forming one or more sets of clustered data. Clusters of data (e.g., predictively grouped data) may be grouped or clustered about a particular attribute of the data, such as a source of data (e.g., a channel of data), a type of customer (e.g., a loyal customer), a degree of urgency for an issue (e.g., a customer is, a type of language, a degree of similarity with synonyms or other words, etc., or any other attribute, characteristic, parameter or the like. In at least one example, a cluster of data may define a subset of electronic messages having one or more similarities (e.g., a statistically same topic) that may be configured to characterize an exchange of messages for purposes of selecting and applying predictively one or more rules to generate a response to message 201a.

While any number of techniques may be implemented, data correlator 233 may apply "k-means clustering," or any other clustering data identification techniques to form clustered sets of data that may be analyzed to determine or learn optimal classifications of data and associated predictive responses thereto. In some examples, data correlator 233 maybe configured to detect patterns or classifications among datasets 233 and other data through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical or empirical technique).

A message router 265 may be configured to identify one or more characteristics of a message, context (e.g., time of day, subject matter, etc.), user demographics, or any other information to determine adaptively a route over which to forward messages 201a to one or more number of automated logic modules or one or more number of agent-related computing devices to generate agent-assisted responses, among others. Examples of user attributes or demographics include a user status, a loyalty member number, a frequent flier number, message topic or subject matter, etc. Further, message router 265 may be configured to identify a destination of response message 201c and whether it ought to be transmitted securely. In some cases, message router 265 may be configured to adaptively route messages to an application (e.g., a text messaging application) or a web site associated with a customer, or to any other computing device. In some examples, one or more rules (e.g., customer or dynamically-modifiable rules) may be configured to cause message router 265 to route messages in accordance with a rule.

A synchronization controller 267 may be configured to identify one or more characteristics of a message to determine adaptively each message in an exchange of messages either asynchronously or synchronously (e.g., via a session). In some examples, one or more rules (e.g., customer or dynamically-modifiable rules) may be configured to cause synchronization controller 267 to route messages in accordance with a rule.

Message generator 269 may be configured to generate response messages 201c, whether asynchronously or synchronously, or whether generated by an automated logic module provided by agent-related computing devices to generate agent-assisted responses. According to some examples, message generator 269 may include a dynamic rule manager 270 that may be configured to automatically or manually generate and apply one or more rules, such as custom rules, to cause further processing and refinement of a response message, whether generated by automated response logic or an agent computer device, or a combination thereof over one or more messages in an exchange of messages. Customized rules may be configured proactively start a chat, optionally along with pre-chat messages or communication data. Data representing rules may be stored in rule data 214 repository.

In various examples, agents or non-technical users may be able to implement configurable rules, and may generate workflows dynamically by modifying or creating one or more rules using user inputs via a user interface (not shown) including, but not limited to, creating new rules, editing rules, disabling rules, deleting rules, publishing changes, pausing all or some rules, evaluating proactive chat rules, dragging and dropping rules and actions to form workflows, etc. Dynamic rule manager 270 may be configured to trigger or implement logic to implement a rule based on data from any element in diagram 200 (e.g., whether to implement a rule to facilitate asynchronous or synchronous messaging, whether to implement a rule to facilitate routing of messages, etc.). In some examples, a rule can be triggered based on a metric, a threshold value, or a range of values compared or calculated against valued associated with content of a message, contextual data, user-related data, and the like. Further, dynamic rule manager 270 and/or any one or more elements depicted in diagram 200 may be configured to implement one or more rules to filter content of messages (and other data), to tag one or more message components (or any other data), and to route messages with dynamically-applied rules to enhance workflows to provide customers optimal experiences to receiving responses and to assist agents to resolve inquiries.

Message response data analyzer 220 is shown to also include a rule data analyzer 240, which, in turn, may include a rule monitor 242, a rule correlator 244, and an automatic rule generator 246. Message response data analyzer 220 may include predictive algorithms and logic that may be applied using specialized rules and/or predictive logic (e.g., via machine learning) to perform analytics to optimize application of rules, which, in some cases, may optimize selection of data and information for presentation (e.g., associated with an interface in a brand-based website). In some examples, an interface may be implemented as a "Modern Chat" interface provided by Khoros,™ LLC.

Rule monitor 242 may include logic configured to track generation of rules, modification of rules, implementation of rules, and other activities associated with rules (e.g., rules to automatically and/or manually filter, tag, or route one or more electronic messages or portions thereof). Further, rule monitor 242 may be configured to identify structure of rules associated with successful and least successful experiences (e.g., by either customer or agent) so as to predict optimize structures or constructions of rules that may be adapted for use by use, for example, an entity computing device (e.g., a brand management-related computing device).

Rule correlator 244 may include logic configured to identify rules (or portions thereof) and associated workflows that may correlate with a range of values indicative of whether a customer, a brand owner, an agent or group of agents, automated response logic modules (e.g., "bots"), etc., may be associated with optimal rules or portions of thereof. For example, rule correlator 244 may be configured to associate a range of values indicative of a range of success as determine one or more metrics. For examples, rules and portions of rules associated with positive feedback associated with results of one or more customer surveys. Also, rules and portions of rules associated may be associated with fewer messages in exchange (e.g., indicative quicker resolution), frequencies with which customers return, revenue amounts, and the like. Hence, rule correlator 244 may be configured to correlate rules and portions of rules to optimal implementation of rules and workforces to suggest to agents or brand computing device, or to automatically implement.

Automatic rule generator 246 may be configured to access and analyze message data 210, model data 212, and rule data 214 relative to performance of one or more rules and portions thereof to identify, determine, calculate, and/or derive a rule or a portion thereof, whereby a rule may be generated automatically, semi-automatically (e.g., with some manual intervention), or manually. Rules generated or proposed by automatic rule generator 246 may be configured to facilitate enhanced accuracies of automatic response logic modules, or bots, to provide more personalized responses, as well as increased blending of responses provided by automatic response logic modules and agent-assisted responses. In some examples, blending of responses may appear seamless and may be driven may one or more rules, any of which may be generated by automatic rule generator 246 and implemented by dynamic rule manager 270.

In one example, response platform 260 including secure channel engine 262, hybridized messaging controller 261, and message response data analyzer 220 may be configured to generate any rules based on analytics. For example, logic may be configured to selectively implement a "hybrid" mode of communication in which a chat session may adaptively modulate between synchronous and asynchronous messaging based on data derived from analytics (e.g., to optimize agent work force availability, etc.). As another example, logic may be configured to adapt timing and presentation of a chat "bubble" at a brand-sponsored web page, as a function of customer attributes or other attributes. Analytics logic may also may be configured to predict a confidence level whether a "chat bot" may automatically a resolve an issue, or whether an agent may be optimally-suited to resolve an issue. Analytics logics may also may be configured to generate one or more rules to throttle chat discovery, or one or more rules to determine priority levels for subsets of electronic messages. Priorities may be used to route messages to either an agent computing device or an automatic logic module, to send messages synchronously or asynchronously, to transmit a message over a public channel or a secure channel, and the like.

Note that diagram 200 depicts but one of various other implementations to form, use, and update a data model 212 for modeling, determining, and predicting message attributes and generation of predicted responses as a function of characterized message components, among other things. Predicted responses may be generated by automated response logic (e.g., "bots") or as routed to optimal agent to provide an agent-assisted response, or the like.

Any of described elements or components set forth in FIG. 2, and any other figure herein, may be implemented as software, applications, executable code, application programming interfaces ("APIs"), processors, hardware, firmware, circuitry, or any combination thereof.

Figure 3:
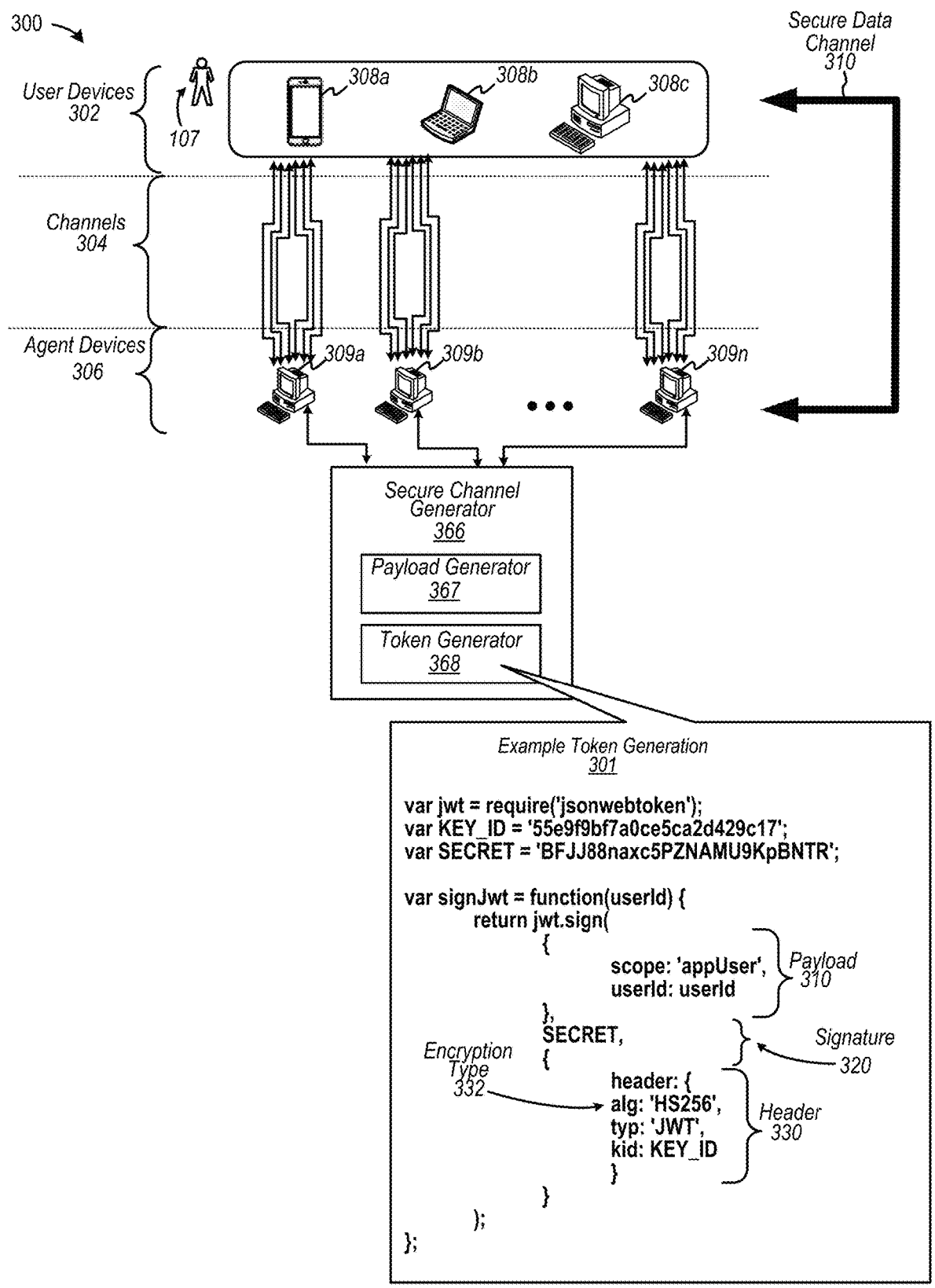
FIG. 3 is a diagram depicting an example of a secure channel generator to generate secure data channels, according to some examples.

FIG. 3 is a diagram depicting an example of a secure channel generator to generate secure data channels, according to some examples. Diagram 300 depicts a secure channel generator 366 including at least a payload generator 367 and a token generator 368. In some examples, payload generator 367 may be configured to identify subsets of data to be included is payload, which may be encrypted and transmitted or referenced by a secure data message. Payload may include summary information. In some examples, data representing user profile information may form a portion of the payload. Further, data representing a name of a brand and/or retailer or manufacturer may be included in a payload, as well as timestamp information, one or more different channels (e.g., Twitter) with which an exchange of messages may be associated, key concepts or subject matter of a "conversation" (e.g., an exchange of electronic messages), one or more prior electronic messages (or summaries thereof) may be include in a payload, etc. According to at least one example, data regarding a history of the exchange of messages may be encrypted and aggregated such that the exchange of messages may be facilitated between any of user devices 302 (e.g., mobile computing device 308a, laptop 308b, or computing device 308c) and any of agent devices 306 (e.g., computing devices 309a to 309n), whereby an originating or notification messages (or other messages) may be exchanged over any different channel (e.g., Twitter, Facebook, Instagram, etc.) at any time during the exchange of electronic messages. Hence, payload generator 367 may be configured to generate a payload that may include information to facilitate asynchronous communication and exchanges of messages by, for example, including archival data (e.g., to maintain a state of a conversation) for use by future exchanges of messages.

Token generator 368 may be configured to generate data associated with an encrypted message including an encrypted payload and an encrypted signature. In some examples, token generator 368 may be configured to execute instructions similar or equivalent to the example token generation 301, which depicts a payload 310, a signature (or "secret") 320, and a header 330 (including an encryption type 332). In some examples, a secure message as described herein may serialized and include a token based on JSON Web Tokens ("JWTs"), according to at least some embodiments. Note various implementations described herein need not be limited to employing JWTs, but rather, may implement various encryption technologies or any other secure data communication methodologies according to various examples.

Figure 4:
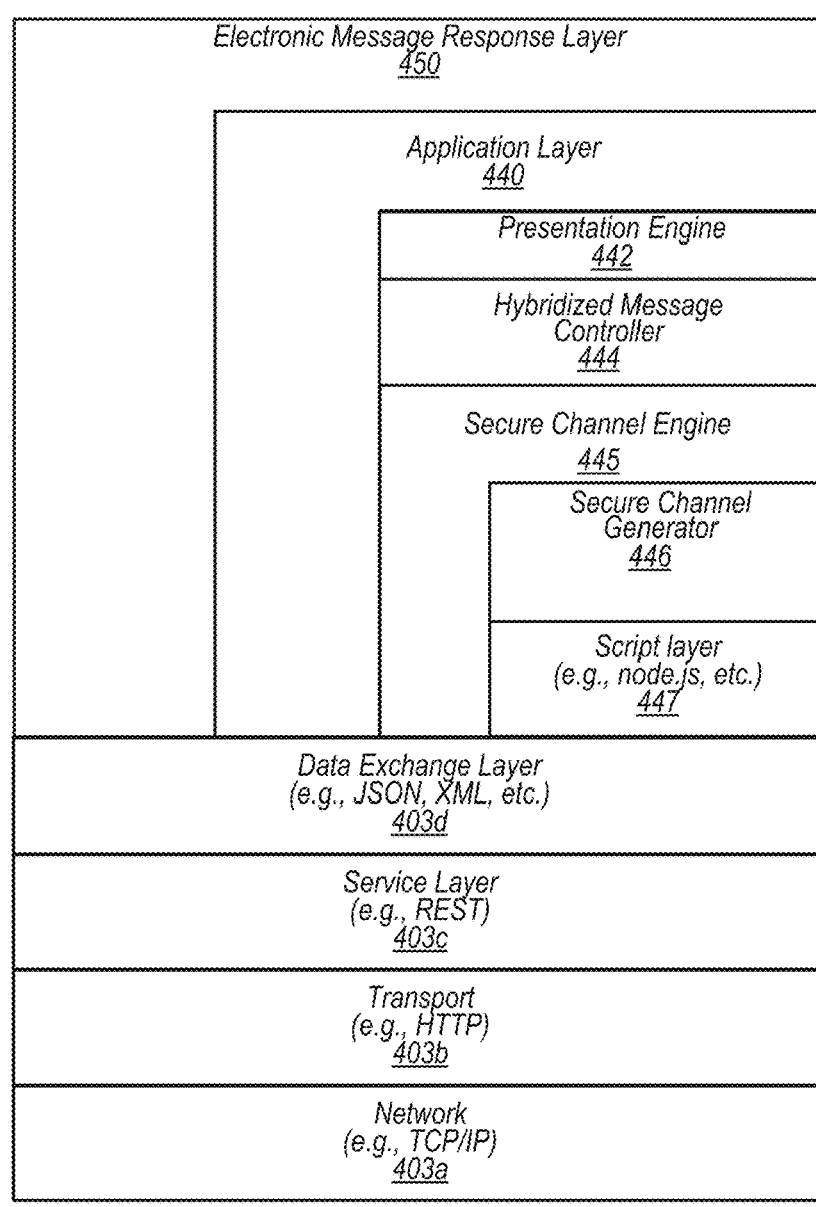
FIG. 4 illustrates an exemplary layered architecture for implementing an electronic message response application, according to some examples.

FIG. 4 illustrates an exemplary layered architecture for implementing an electronic message response application, according to some examples. Diagram 400 depicts application stack ("stack") 401, which is neither a comprehensive nor a fully inclusive layered architecture for implementing secure data channels to facilitate asynchronous and synchronous exchanges of messages to facilitate customer care in resolving issues relating to a brand. One or more elements depicted in diagram 400 of FIG. 4 may include structures and/or functions as similarly-named or similarly-numbered elements depicted in other drawings, or as otherwise described herein, in accordance with one or more examples, such as described relative to FIG. 1 or any other figure or description herein.

Application stack 401 may include an electronic message response layer 450 upon application layer 440, which, in turn, may be disposed upon any number of lower layers (e.g., layers 403a to 403d). Electronic message response layer 450 and application layer 440 may be disposed on data exchange layer 403d, which may implemented using any programming language, such as HTML, JSON, XML, etc., or any other format to effect generation and communication of requests and responses among computing devices and computational resources constituting an enterprise and an enterprise resource planning application and/or platform. Data exchange layer 403d may be disposed on a service layer 403c, which may provide a transfer protocol or architecture for exchanging data among networked applications. For example, service layer 403c may provide for a RESTful-compliant architecture and attendant web services to facilitate GET, PUT, POST, DELETE, and other methods or operations. In other examples, service layer 403c may provide, as an example, SOAP web services based on remote procedure calls ("RPCs"), or any other like services or protocols. Service layer 403c may be disposed on a transport layer 403b, which may include protocols to provide host-to-host communications for applications via an HTTP or HTTPS protocol, in at least this example. Transport layer 403b may be disposed on a network layer 403a, which, in at least this example, may include TCP/IP protocols and the like. Note that in accordance with some examples, layers 403a to 403d facilitate implementation of a risk management data channel as set forth herein.

As shown, electronic message response layer 450 may include (or may be layered upon) an application layer 440 that includes logic constituting a presentation engine layer 442, a hybridized message controller layer 444, a secure channel engine layer 445, which may include a secure channel generator layer 446. Secure channel generator layer 446 may be layered upon a script layer 447. In some examples, script layer 447 may be configured to implement node.js, which may be a cross-platform, JavaScript runtime environment. Is some cases, node.js may execute JavaScript code independent of a browser. Node.js is maintained by the Linux Foundation of San Francisco, Calif., USA.

Any of the described layers of FIG. 4 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by Khoros, LLC, or the like. The above described techniques may be varied and are not limited to the embodiments, examples or descriptions provided.

Figure 5:
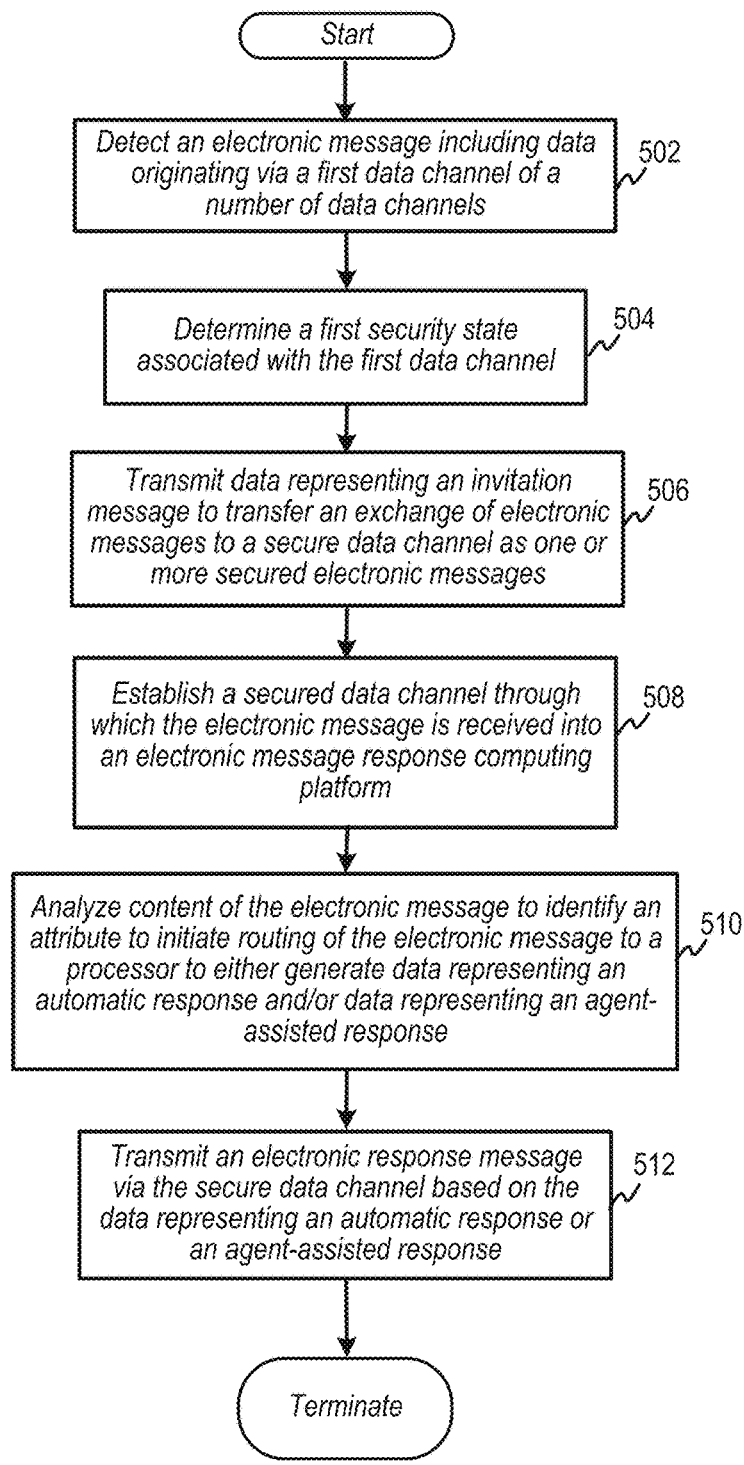
FIG. 5 is a flow diagram as an example of implementing a response electronic message in an exchange of electronic messages, according to some embodiments.

FIG. 5 is a flow diagram as an example of implementing a response electronic message in an exchange of electronic messages, according to some embodiments. Flow 500 may be an example of predictively determining whether to generate a secure response message originating at either an automated response logic module (e.g., a bot) or an agent as an agent-assisted response, or a combination thereof. At 502, electronic message including data originating via a first data channel, such as a public or non-secure data channel, may be detected. The first data channel may be one of any number of data different channels (e.g., among Linked In, Facebook messenger, Twitter, etc.). At 504, a security state associated with a first data channel can be determined. Examples of a security state includes non-secure security states and secure security states. At 506, data representing an invitation message to transfer an exchange of electronic messages may be transmitted unto and through a secured data channel. The exchange of messages may include one or more secure electronic messages. At 508, a secured data channel through which an electronic message is received into an electronic message response computing platform. At 510, content of an electronic message may be analyzed to identify an attribute to, for example, initiate routing of the electronic message to a processor to either generate data representing an automatic response and/or data representing an agent-assisted response. Thus, exchanges of secure messages may include a hybrid or blend of automatic responses (e.g., "bot" generated responses) and agent-assisted responses. At 512, an electronic response message may be transmitted via a secure data channel based on data representing an automatic response or an agent-assisted response. Transmission of the data representing an electronic response message may be a function of availability (e.g., whether available or absent) of a first data channel.

Figure 6:
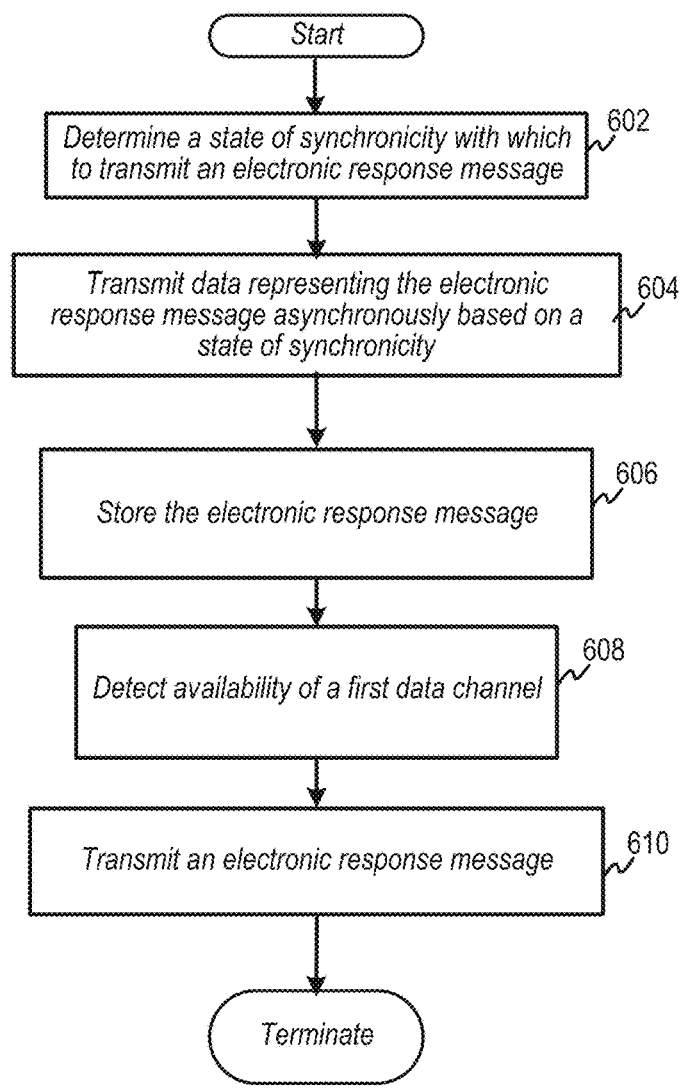
FIG. 6 is a flow diagram as an example of implementing a response electronic message as a function of synchronicity, according to some embodiments.

FIG. 6 is a flow diagram as an example of implementing a response electronic message as a function of synchronicity, according to some embodiments. Flow 600 may begin at 602, at which a state of synchronicity with which to transmit an electronic response message may be determined (e.g., asynchronously or otherwise). At 604, data representing an electronic response message asynchronously based on a state of synchronicity. At 606, an electronic response message may be stored (e.g., at least temporarily), until, for example, a secure channel is present. At 608, availability of a first data channel may be detected. In response, a notification message may be transmitted via the first data channel to notify a recipient that an asynchronous communication may be available upon accessing the secure data channel. A secure token may be used in association with the asynchronous communication maintain continuity and flow of an exchange of messages. At 610, an electronic response message may be transmitted upon re-establishing a secure data channel.

Figure 7:
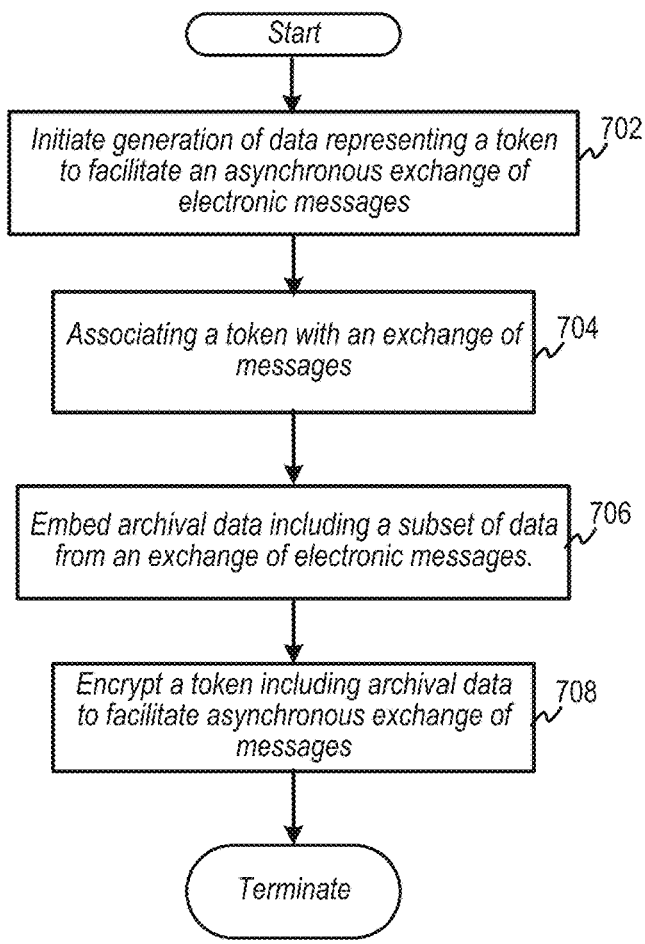
FIG. 7 is a flow diagram as an example of forming a secured data channel based on data representing a token, according to some embodiments.

FIG. 7 is a flow diagram as an example of forming a secured data channel based on data representing a token, according to some embodiments. Flow 700 may begin at 702, at which generation of data representing a token may be initiated to facilitate an asynchronous (and/or synchronous) exchange of electronic messages. At 704, a token may be associated with an exchange of messages. At 706, archival data including a subset of data from an exchange of electronic messages (or a summarization or data compressed version) may be embedded in a token or in a message associated with the token. At 708, a token including or associated with archival data may be encrypted to facilitate secure, asynchronous exchange of messages. In some examples, generating or encrypting data representing a token may include generating the token as a JSON Web Token ("JWT"). In at least one example, a second data channel (e.g., another public channel, such as another social network platform, such as, Instagram) may be used to implement asynchronous communication regardless of whether the first data channel is different than the second data channel. A token may be used to facilitate an asynchronous exchange of electronic messages.

Figure 8:
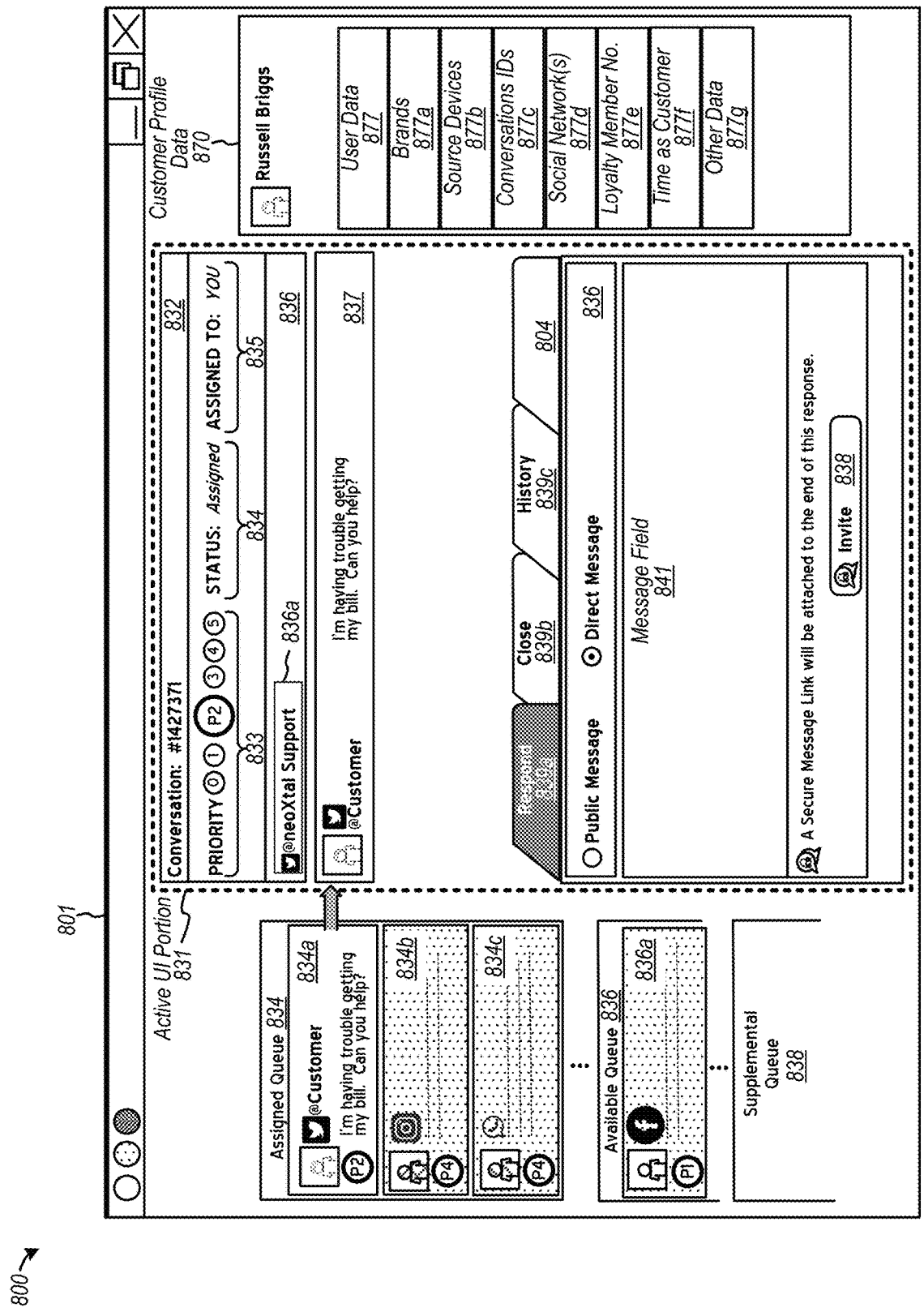
FIG. 8 depicts an example of a user interface including a number of queues that may include conversations (e.g., exchanges of messages) requiring action, according to some examples.

FIG. 8 depicts an example of a user interface including a number of queues that may include conversations (e.g., exchanges of messages) requiring resolution, according to some examples. Diagram 800 depicts an assigned queue 834 includes exchanges of electronic messages and/or conversations 834a, 834b, and 834c that are assigned specifically to an agent computing device into which a specific agent (e.g., agent-user) is logged for generating a response. As shown, each exchange of messages may be surface to display higher priorities first, such as depicted within encircle "P2" to represent a second highest level of priority. Available queue 836 includes conversations 836a that are available to any agent upon which to act. Supplemental queue 838 represents one or more additional queues that may include conversations that require supplemental activity or action, such as "needing approval" or "needing expert assistance," or requiring other supplemental processing (not shown). Whether such conversations appear in supplemental queue 838 may depend on whether an agent has permissions or a role authorized to process conversations in those specialized queues, according to at least some examples.

In this example, user interface 801 depicts an active user interface ("UI") portion 831 and another user interface portion depicting customer profile data 870. Active user interface portion 831 is focused on interacting and/or responding to "@Customer" of conversation 834a. As shown, the associated originating message "I'm having trouble getting my bill. Can you help?" has been assigned a conversation identifier ("1427371") 832. This conversation is of a priority "2" out of 6 priority levels 833, has a status 834 of being assigned, and is assigned 835 to a particular agent (e.g., "you"). Further, an entity computing system associated with the brand "neoXtal" has an agent with an electronic identifier "@neoXtal" 836a in interface portion 836. The text of the originating message may be displayed in interface portion 837.

Diagram 800 also depicts multiple tabs, as user inputs, that may be implemented to perform a variety of actions. Interactive tab 839a may be implemented to generate a response, tab 839b may be configured to cause a conversation, 839c may be configured to present a review of the history of a customer or conversation, and tab 804 may provide any other action. In the example shown, highlighted tab 839b indicates a response can be generated. Interface portion 836 enables generation of a public response message or a direct message (e.g., a secure message), whereby the message may be input into a message field 841. A secure message link may be attached to a response upon activation of an "invite" 838 user input, which, when activated, may cause an invite manager to generate an invite message.

Customer profile data 870 may include user-specific data 877 (e.g., name, purchased products, email address, address, phone number, etc.), brands data 877a indicating brands that a user has purchased or searched, source devices 877b may include a list of computing devices associated with user "Russell Briggs," one or more conversation identifiers 877c for specific conversation or exchange of messages (over multiple conversations), one or more social networks 877d the user may use, loyalty member number data 877e, length of time as customer 877f, and other data 877g. In some these examples, customer profile data 870 may be encrypted included along with messages and associated tokens used to generate a secure communication channel, as described herein.

Figure 9:
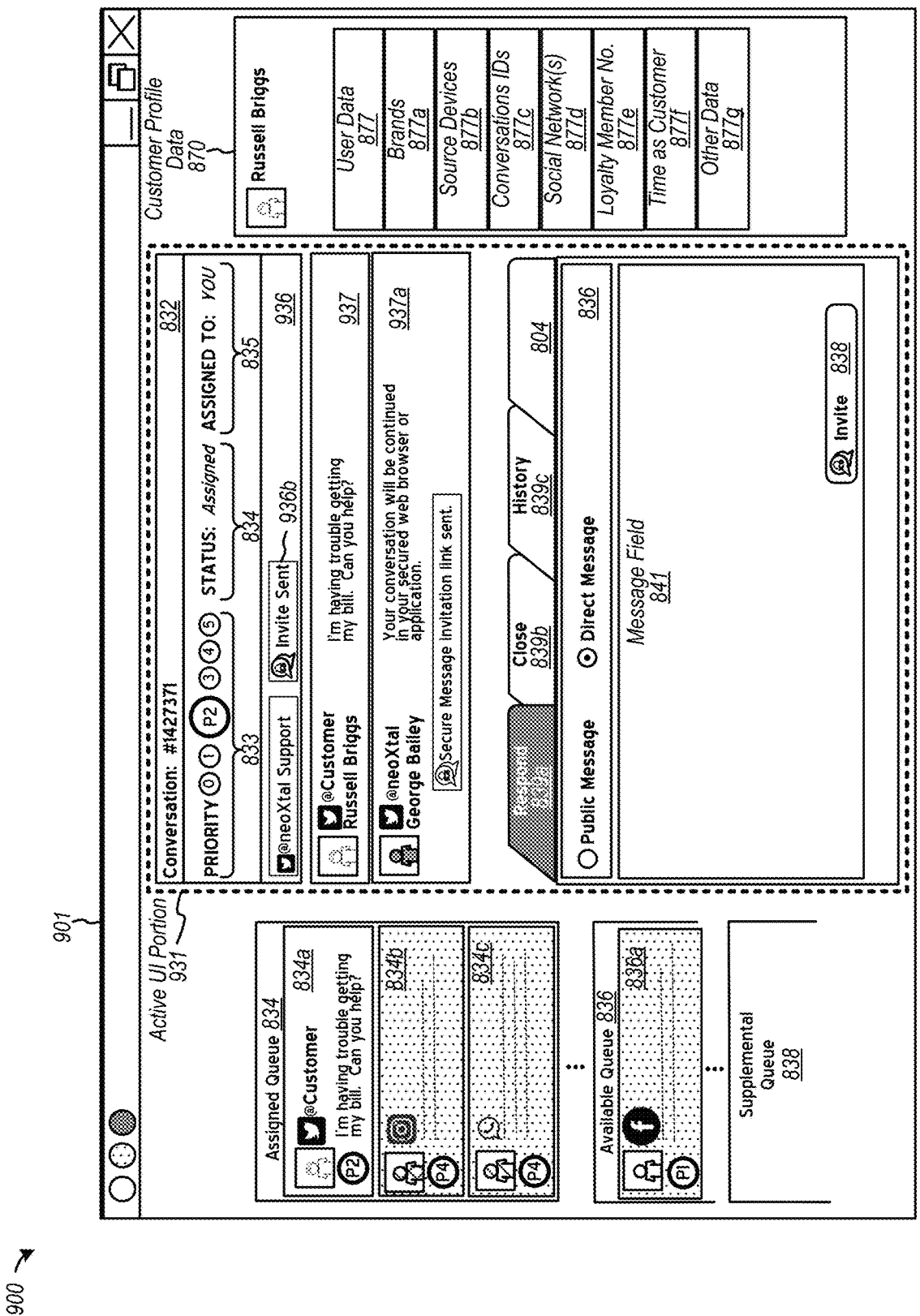
FIG. 9 depicts an example of a user interface establishing a secure messaging data channel for a conversation (e.g., exchanges of messages) prompting a response, according to some examples.

FIG. 9 depicts an example of a user interface establishing a secure messaging data channel for a conversation (e.g., exchanges of messages) prompting a response, according to some examples. In diagram 900, user interface 901 depicts an active user interface ("UI") portion 931. Active user interface portion 931 is focused on interacting and/or responding to "@Customer" of conversation 834a originating in FIG. 8. An entity computing system associated with the brand "neoXtal" has an agent with an electronic identifier "@neoXtal," whereby the conversation status 936b indicates an "Invite Sent" in interface portion 936. As shown, the associated originating message "I'm having trouble getting my bill. Can you help?" may be displayed in interface portion 937. As shown in interface portion 937a indicates agent "George Bailey" has sent the following response electronic message: "your conversation will be continued in the secured web browser or application (e.g., text application)," which has been sent as a secure message including an invitation link. In one or more implementations, elements depicted in diagram 900 of FIG. 9 may include structures and/or functions as similarly-named or similarly-numbered elements depicted in other drawings.

Figure 10B:
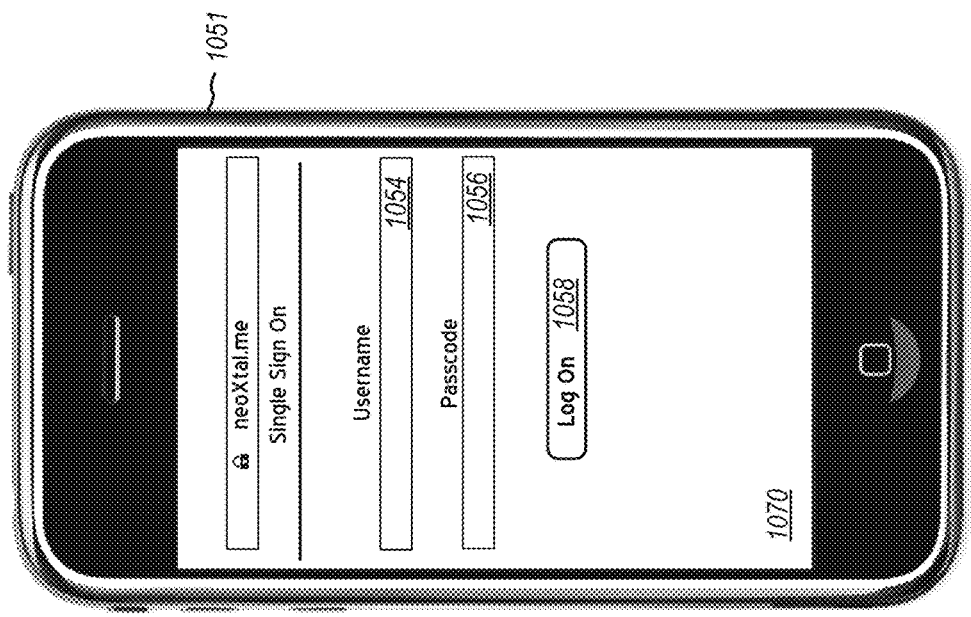
FIGS. 10A and 10B depict examples of user interfaces at a computing device at which an invitation message is received to form a secure message channel, according to some examples.
Figure 10A:
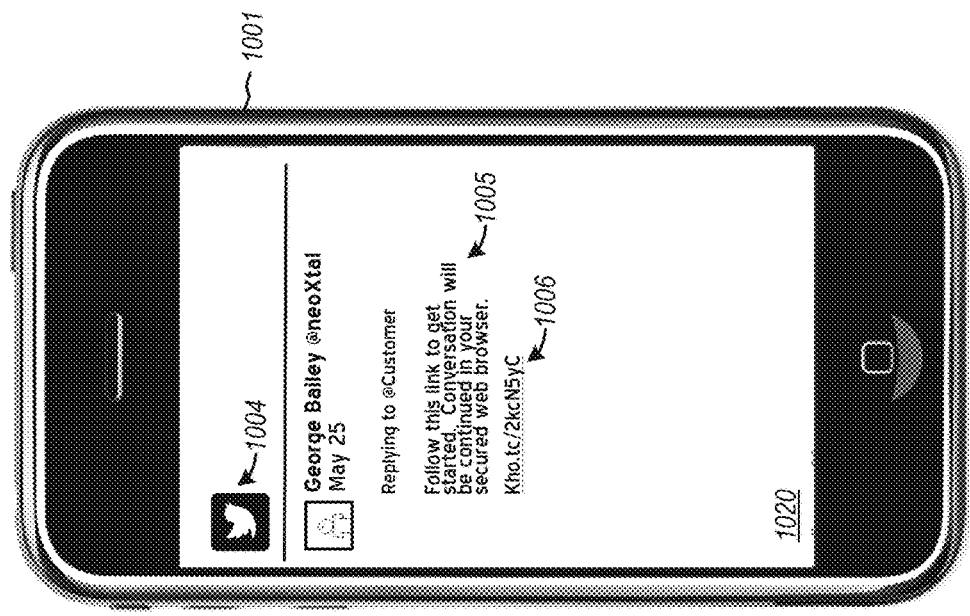

FIGS. 10A and 10B depict examples of user interfaces at a computing device at which an invitation message is received to form a secure message channel, according to some examples. Diagram 1000 in FIG. 10A depicts a mobile computing device 1001 having a user interface 1020. As shown, an invitation message 1005 has been received over a first data channel 1004 (e.g., a public data channel, such as Twitter, or the like). Invitation message 1005 includes an encrypted link 1006 configured to initiate transfer to a secure data channel. Diagram 1050 in FIG. 10B depicts a mobile computing device 1051 having a user interface 1070. As shown, user interface 1070 includes data fields to authenticate user identification for logging onto (e.g., single sign on) a secure data channel. Data representing a username 1054 and a passcode 1056 may be entered and transmitted upon activation of user input 1058 to establish a secure data channel.

Figure 11:
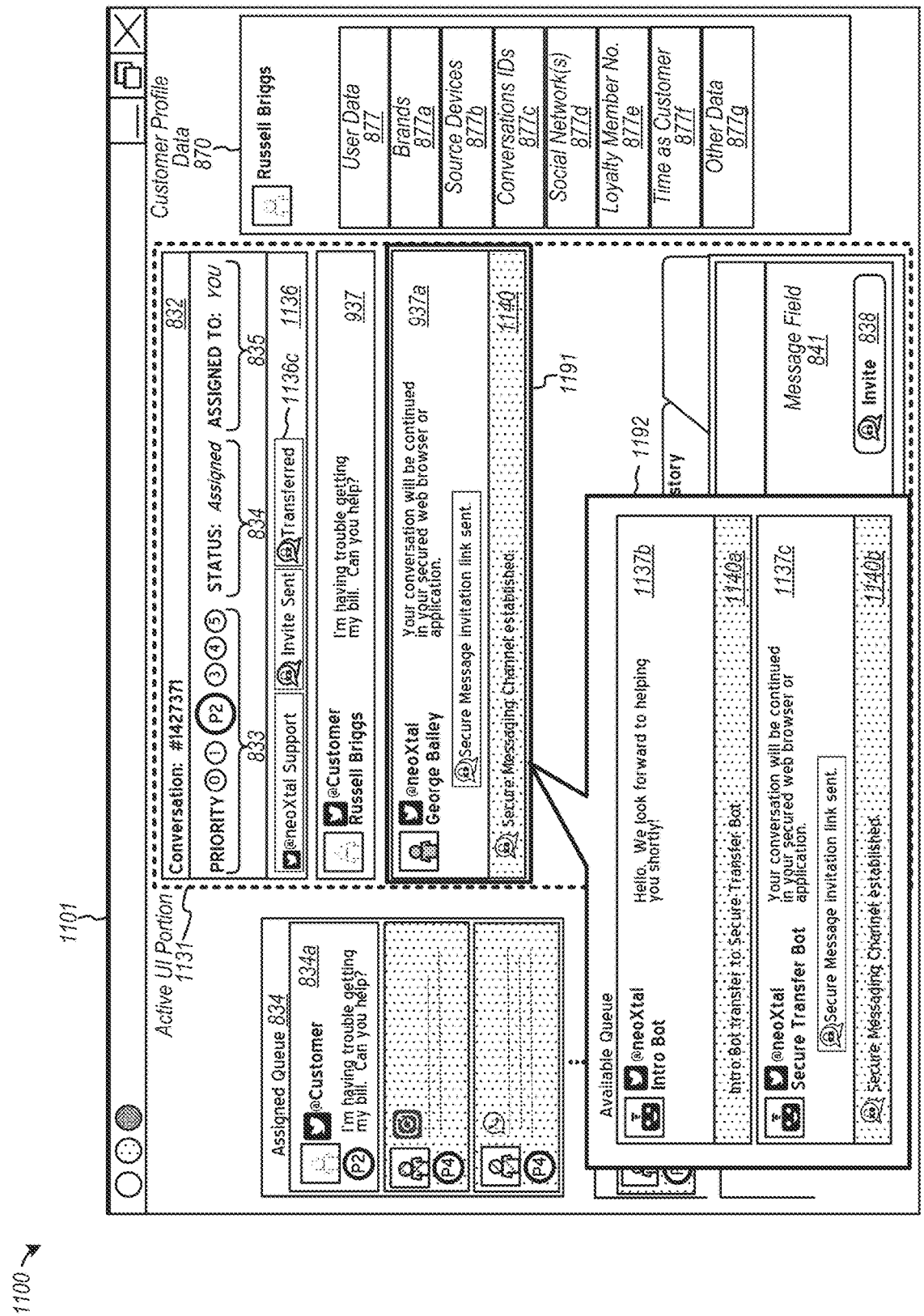
FIG. 11 depicts an example of a user interface associated with an established secure messaging data channel for a conversation (e.g., exchanges of messages) prompting a response, according to some examples.

FIG. 11 depicts an example of a user interface associated with an established secure messaging data channel for a conversation (e.g., exchanges of messages) prompting a response, according to some examples. In diagram 1100, user interface 1101 depicts an active user interface ("UI") portion 1131. Active user interface portion 1131 is focused on interacting and/or responding to "@Customer" of conversation 834a originating in FIG. 8. An entity computing system associated with the brand "neoXtal" has an agent with an electronic identifier "@neoXtal," whereby the conversation status 1136b indicates an exchange of messages have been "Transferred" to a secure data channel in interface portion 1136. As shown, messages in interface portions 937 and 937a, and subsequent exchanges of messages, have been transferred to a secure data channel as shown in interface portion 1140 ("Secure Messaging Channel established"). In one or more implementations, elements depicted in diagram 1100 of FIG. 11 may include structures and/or functions as similarly-named or similarly-numbered elements depicted in other drawings.

In alternate examples, message 937a in user interface portion 1191 and transmission of an invitation message (e.g., by agent "George Bailey") may be implemented by automatic response modules (e.g., "bots"), as indicated within inset 1192. As shown, an automated response module may be configured to transmit an introductory message 1137b ("Hello. We look forward to helping you shortly!"), whereby a status interface portion 1140a indicates control of a response message may be transitioned to another automated response module configured to transmit an invitation 1137c. Subsequently, a status interface portion 1140b indicates a secure messaging channel has been established.

Figure 12:
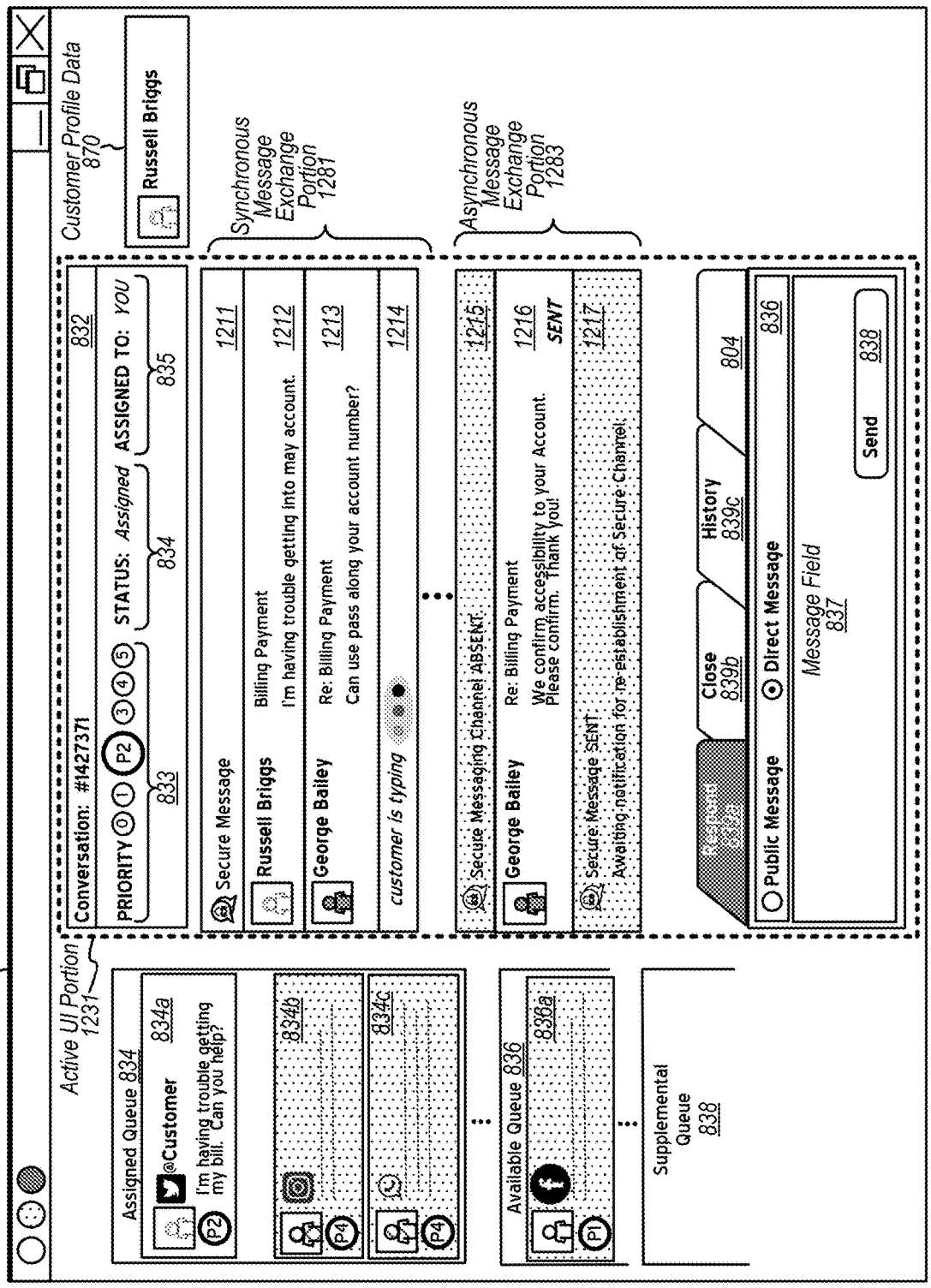
FIG. 12 depicts an example of a user interface to facilitate exchanges of messages via various states of synchronicity, according to some examples.

FIG. 12 depicts an example of a user interface to facilitate exchanges of messages via various states of synchronicity, according to some examples. In diagram 1200, user interface 1201 depicts an active user interface ("UP") portion 1231 in which user interface portions 1211 to 1214 may be associated with a synchronous message exchange portion 1281 of a conversation, whereas user interface portions 1215 to 1217 may be associated with an asynchronous message exchange portion 1283. Interface portion 1211 indicates exchanges of synchronous messages 1212 and 1213 are via a secure message channel. Interface portion 1214 receives a data signal indicating customer "Russell Briggs" indicating a secure message is being generated for receipt into synchronous message exchange portion 1281. Next, consider a session with a customer is interrupted (e.g., customer terminates an application, loss of network connection, etc.). Interface portion 1215 indicates a secure messaging channel is absent. An agent may generate an asynchronous message (e.g., "We confirm accessibility to your account. Please confirm. Thank you!"), as shown in interface portion 1216. This message may be transmitted or stored until a secure message channel is reestablished, as indicated in user interface portion 1217. Subsequently, a customer an agent may exchange additional messages synchronously or asynchronously, or a blend thereof. In one or more implementations, elements depicted in diagram 1200 of FIG. 12 may include structures and/or functions as similarly-named or similarly-numbered elements depicted in other drawings.

Figure 13:
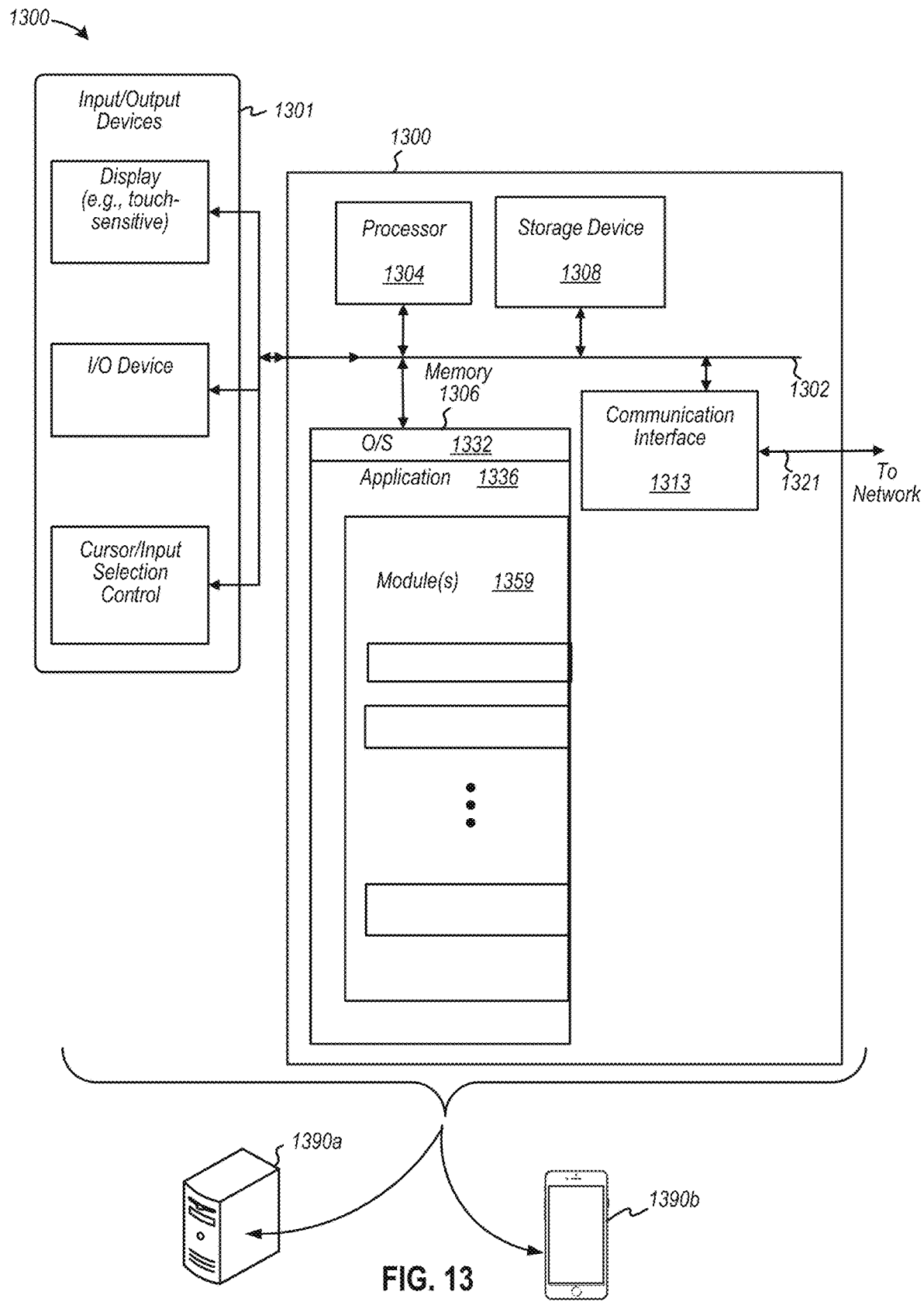
FIG. 13 is a diagram depicting an example of an electronic message response platform configured to harvest and analyze electronic messages, according to some examples.

FIG. 13 illustrates examples of various computing platforms configured to provide various functionalities to components of an electronic message response management platform 1300, which may be used to implement computer programs, applications, methods, processes, algorithms, or other software, as well as any hardware implementation thereof, to perform the above-described techniques.

In some cases, computing platform 1300 or any portion (e.g., any structural or functional portion) can be disposed in any device, such as a computing device 1390a, mobile computing device 1390b, and/or a processing circuit in association with initiating any of the functionalities described herein, via user interfaces and user interface elements, according to various examples.

Computing platform 1300 includes a bus 1302 or other communication mechanism for communicating information, which interconnects subsystems and devices, such as processor 1304, system memory 1306 (e.g., RAM, etc.), storage device 1308 (e.g., ROM, etc.), an in-memory cache (which may be implemented in RAM 1306 or other portions of computing platform 1300), a communication interface 1313 (e.g., an Ethernet or wireless controller, a Bluetooth controller, NFC logic, etc.) to facilitate communications via a port on communication link 1321 to communicate, for example, with a computing device, including mobile computing and/or communication devices with processors, including database devices (e.g., storage devices configured to store atomized datasets, including, but not limited to triplestores, etc.). Processor 1304 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1300 exchanges data representing inputs and outputs via input-and-output devices 1301, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 1301 may be implemented as, or otherwise substituted with, a user interface in a computing device associated with, for example, a user account identifier in accordance with the various examples described herein.

According to some examples, computing platform 1300 performs specific operations by processor 1304 executing one or more sequences of one or more instructions stored in system memory 1306, and computing platform 1300 can be implemented in a client-server arrangement, peer-to-peer arrangement, or as any mobile computing device, including smart phones and the like. Such instructions or data may be read into system memory 1306 from another computer readable medium, such as storage device 1308. In some examples, hard-wired circuitry may be used in place of or in combination with software instructions for implementation. Instructions may be embedded in software or firmware. The term "computer readable medium" refers to any tangible medium that participates in providing instructions to processor 1304 for execution. Such a medium may take many forms, including but not limited to, non-volatile media and volatile media. Non-volatile media includes, for example, optical or magnetic disks and the like. Volatile media includes dynamic memory, such as system memory 1306.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1302 for transmitting a computer data signal.

In some examples, execution of the sequences of instructions may be performed by computing platform 1300. According to some examples, computing platform 1300 can be coupled by communication link 1321 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1300 may transmit and receive messages, data, and instructions, including program code (e.g., application code) through communication link 1321 and communication interface 1313. Received program code may be executed by processor 1304 as it is received, and/or stored in memory 1306 or other non-volatile storage for later execution.

In the example shown, system memory 1306 can include various modules that include executable instructions to implement functionalities described herein. System memory 1306 may include an operating system ("O/S") 1332, as well as an application 1336 and/or logic module(s) 1359. In the example shown in FIG. 13, system memory 1306 may include any number of modules 1359, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1359 of FIG. 13, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1359 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1359 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1359 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
   detecting an electronic message including data originating via a first data channel of a plurality of data channels;
   determining a first security state associated with the first data channel;
   transmitting data representing an invitation message to transfer an exchange of electronic messages based on the electronic message to a secure data channel as one or more secure electronic messages;
   establishing the secure data channel through which the electronic message is received into an electronic message response platform including one or more processors;
   analyzing content of the electronic message to identify an attribute to initiate routing of the electronic message to a processor to either generate data representing an automatic response or data representing an agent-assisted response, or both; and
   transmitting data representing an electronic response message via the secure data channel based on the data representing the automatic response or then agent-assisted response,
   wherein transmitting the data representing the electronic response message is a function of availability of the first data channel.

2. The method of claim 1 wherein transmitting the data representing the electronic response message comprises:
   determining a state of synchronicity with which to transmit the electronic response message.

3. The method of claim 2 further comprising:
   transmitting the data representing the electronic response message asynchronously based on the state of synchronicity.

4. The method of claim 3 further comprising:
   storing the electronic response message;
   detecting availability of the first data channel; and
   transmitting the electronic response message.

5. The method of claim 2 further comprising:
   detecting presence of the first data channel;
   transmitting a notification message via the first data channel that the electronic response is available via the secure channel; and
   detecting a notification response message via the secure channel to receive another electronic message of the exchange of electronic messages.

6. The method of claim 2 wherein transmitting the data representing the electronic response message as constituent of the exchange of electronic messages comprises:
   transmitting a first subset of electronic messages of the exchange of electronic messages synchronously; and
   transmitting a second subset of electronic messages of the exchange of electronic messages asynchronously.

7. The method of claim 1 wherein analyzing the content of the electronic message to identify the attribute comprises:
   determining the attribute to form a determined attribute;
   characterizing the exchange of messages based on the determined attribute to form a characterized exchange of messages; and
   routing of the characterized exchange of messages including the electronic message based on a value indicative of a characteristic.

8. The method of claim 7 wherein the characteristic is indicative of a priority value.

9. The method of claim 7 wherein the characteristic is indicative of one or more values associated with one or more portions of the content of electronic message.

10. The method of claim 9 wherein the characteristic is indicative of one or more or more tags associated with the one or more values.

11. The method of claim 7 wherein the characteristic is indicative of availability of the agent-assisted response.

12. The method of claim 1 wherein establishing the secure data channel comprises:
    generating data representing a token to facilitate an asynchronous exchange of electronic messages.

13. The method of claim 12 wherein generating the data representing the token comprises:
    embedding archival data including a subset of data from the exchange of electronic messages.

14. The method of claim 12 wherein generating the data representing the token comprises:
  generating the token as a JSON Web Token ("JWT").

15. The method of claim 1 wherein establishing the secure data channel comprises:
  detecting a second data channel associated with the exchange of electronic messages; and
  implementing the token to facilitate an asynchronous exchange of electronic messages.

16. A system comprising:
  a memory including executable instructions; and
  a processor, responsive to executing the instructions, is configured to:
  detect an electronic message including data originating via a first data channel of a plurality of data channels each associated with a social network computing system;
  determine a first security state associated with the first data channel;
  transmit data representing an invitation message to transfer an exchange of electronic messages based on the electronic message to a secure data channel as one or more secure electronic messages;
  establish the secure data channel through which the electronic message is received into an electronic message response platform including one or more processors;
  analyze content of the electronic message to identify an attribute to initiate routing of the electronic message to a processor to either generate data representing an automatic response or data representing an agent-assisted response, or both; and
  transmit data representing an electronic response message via the secure data channel based on the data representing the automatic response or then agent-assisted response,
  wherein the data representing the electronic response message is transmitted as a function of availability of the first data channel.

17. The system of claim 16 wherein a subset of the instructions further causes the processor to:
  determine a state of synchronicity with which to transmit the electronic response message.

18. The system of claim 17 wherein a subset of the instructions further causes the processor to:
  transmit the data representing the electronic response message asynchronously based on the state of synchronicity.

19. The system of claim 18 wherein a subset of the instructions further causes the processor to:
  store the electronic response message;
  detect availability of the first data channel; and
  transmit the electronic response message.

20. The system of claim 17 wherein a subset of the instructions configured to establish the secure data channel is further configured to cause the processor to:
  generate data representing a token to facilitate an asynchronous exchange of electronic messages.

* * * * *